US 8,984,248 B2

(12) United States Patent
Morishita et al.

(10) Patent No.: US 8,984,248 B2
(45) Date of Patent: *Mar. 17, 2015

(54) DATA MIGRATION SYSTEM AND DATA MIGRATION METHOD

(71) Applicant: Hitachi, Ltd., Tokyo (JP)

(72) Inventors: Noboru Morishita, Yokohama (JP); Hideo Saito, Yokohama (JP); Yoshiaki Eguchi, Yokohama (JP); Masayuki Yamamoto, Sagamihara (JP); Akira Yamamoto, Sagamihara (JP)

(73) Assignee: Hitachi, Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/144,240

(22) Filed: Dec. 30, 2013

(65) Prior Publication Data
US 2014/0115289 A1 Apr. 24, 2014

Related U.S. Application Data

(63) Continuation of application No. 12/992,383, filed as application No. PCT/JP2010/006117 on Oct. 14, 2010, now Pat. No. 8,645,653.

(51) Int. Cl.
*G06F 12/00* (2006.01)
*G06F 13/00* (2006.01)
*G06F 3/06* (2006.01)

(52) U.S. Cl.
CPC ............ *G06F 3/0647* (2013.01); *G06F 3/0608* (2013.01); *G06F 3/0611* (2013.01); *G06F 3/0644* (2013.01); *G06F 3/0665* (2013.01); *G06F 3/067* (2013.01); *G06F 3/0619* (2013.01)
USPC ........... 711/165; 711/100; 711/154; 711/161; 711/162; 711/170; 711/203

(58) Field of Classification Search
None
See application file for complete search history.

(56) References Cited

U.S. PATENT DOCUMENTS

| 6,108,748 A | 8/2000 | Ofek et al. |
| 2007/0079099 A1 | 4/2007 | Eguchi |

(Continued)

FOREIGN PATENT DOCUMENTS

| EP | 0926585 A2 | 6/1999 |
| EP | 1 857 918 A2 | 11/2007 |

(Continued)

OTHER PUBLICATIONS

International Search Report and the Written Opinion of the International Searching Authority, issued in International Application No. PCT/JP2010/006117, dated May 26, 2011.

(Continued)

*Primary Examiner* — Midys Rojas
(74) *Attorney, Agent, or Firm* — McDermott Will & Emery LLP

(57) ABSTRACT

A second storage maps a migration source volume to a virtual volume of a migration destination volume according to storage virtualization technology. A host system including a host switches an access path from an access path to the migration source volume to an access path to the migration destination volume. The second storage executes copy processing of migrating, from the migration source volume to the migration destination volume, data in an assigned area of a virtual volume according to thin provisioning of the migration source volume based on the information contained in the first thin provisioning information in the first storage, and copying that data from the migration destination volume to a virtual volume according to thin provisioning of a copy destination volume in the second storage. The second storage associates the virtual volume of the copy destination volume with the migration destination volume in substitute for the original virtual volume.

6 Claims, 32 Drawing Sheets

(56) References Cited

U.S. PATENT DOCUMENTS

| | | |
|---|---|---|
| 2008/0177947 A1 | 7/2008 | Eguchi et al. |
| 2008/0282047 A1 | 11/2008 | Arakawa et al. |
| 2010/0058021 A1 | 3/2010 | Kawamura |
| 2010/0180078 A1 | 7/2010 | Satoyama et al. |
| 2011/0320754 A1 | 12/2011 | Ichikawa et al. |

FOREIGN PATENT DOCUMENTS

| | | |
|---|---|---|
| JP | 2007-102455 A | 4/2007 |
| JP | 2007-213466 A | 8/2007 |
| JP | 2008-176627 A | 7/2008 |
| JP | 2008-282382 A | 11/2008 |
| JP | 2010055557 A | 3/2010 |

OTHER PUBLICATIONS

U.S. Office Action issued in U.S. Appl. No. 12/992,383, dated Apr. 25, 2013.

U.S. Notice of Allowance issued in U.S. Appl. No. 12/992,383, dated Sep. 30, 2013.

Fig.4

| LOGICAL VOLUME MANAGEMENT INFORMATION | 60 |
|---|---|
| LOGICAL VOLUME NUMBER | |
| CAPACITY | |
| STATUS: NORMAL/BLOCKED/UNUSED | |
| HOST DEFINITION INFORMATION LIST | |
| VIRTUAL VOLUME NUMBER | |
| READ/WRITE INHIBITION FLAG: ON/OFF | |
| READ/WRITE INHIBITION RANGE | |
| ATTRIBUTE: NORMAL/POOL | |

Fig.5

| VIRTUAL VOLUME MANAGEMENT INFORMATION 61 |
|---|
| VIRTUAL VOLUME NUMBER |
| CAPACITY |
| STATUS: NORMAL/BLOCKED/UNUSED |
| CACHE OPERATIONAL STATE: ENABLED/INHIBITED |
| STORAGE LOCATION: INTERNAL/EXTERNAL |
| TP ATTRIBUTE: YES/NO |
| DRIVE GROUP/EXTERNAL VOLUME NUMBER/MAPPING MANAGEMENT NUMBER |
| TOP ADDRESS |
| END ADDRESS |
| ZERO DATA ABANDONMENT EXECUTION STATE: IN EXECUTION/NON-EXECUTION |

Fig.10

POOL MANAGEMENT INFORMATION 65

| POOL NUMBER |||
|---|---|---|
| ATTRIBUTE: THIN PROVISIONING/SNAPSHOT |||
| PAGE SIZE |||
| STATUS: NORMAL/BLOCKED/UNUSED |||
| OVERALL | CAPACITY ||
|  | USED AMOUNT ||
|  | RESERVED AMOUNT ||
|  | UTILIZATION THRESHOLD (UPPER LIMIT) ||
|  | UTILIZATION THRESHOLD (LOWER LIMIT) ||
| STORAGE HIERARCHY 1 |  ||
| ⋮ |||
| STORAGE HIERARCHY (n-1) |  ||
| POOL VOLUME LIST |||
| PAGE MANAGEMENT INFORMATION UNUSED QUEUE HEADER |||
| PAGE MANAGEMENT INFORMATION |||

Fig.14

COPY MANAGEMENT INFORMATION     67

| COPY SOURCE VOLUME NUMBER |
| --- |
| COPY DESTINATION VOLUME NUMBER |
| COPY STATUS: IN EXECUTION/SUSPENDED/UNUSED |
| COPY BM: ON (WITH DIFFERENCE) /OFF (NO DIFFERENCE) |
| RESIDUAL QUANTITY |
| COPY MODE: NORMAL/THIN PROVISIONING |
| TP INFORMATION REFERRAL MODE: INDIVIDUAL/COLLECTIVE |
| ZERO DATA ABANDONMENT MODE: NON-EXECUTION/EXECUTION DURING COPY/ASYNCHRONOUS EXECUTION |
| INITIAL COPY FLAG |

DATA MIGRATION SYSTEM AND DATA MIGRATION METHOD

CROSS-REFERENCE

This is a continuation of U.S. application Ser. No. 12/992,383, filed on Nov. 12, 2010, which is a U.S. National Phase under 35 U.S.C. §371 of International Application No. PCT/JP2010/006117, filed on Oct. 14, 2010, the disclosures of which Applications are incorporated by reference herein.

TECHNICAL FIELD

The present invention relates to technology of migrating data between storage systems.

BACKGROUND ART

Data migration technology of migrating data from a first storage system to a second storage system is known. For example, if a storage system is newly installed, data is sometimes migrated from the existing storage system to the newly installed first storage system. In addition, while the storage system is in use, there are cases where data is migrated from a high load storage system to a low load storage system. Data migration is also performed between storage apparatuses in the storage system in addition being performed between storage systems.

Patent Literature 1 discloses technology of migrating data transparently to a host computer (hereinafter referred to as the "host") between storage systems while maintaining access from the host. According to Patent Literature 1, a first storage system (storage system as the data migration destination) is coupled between the host and a second storage system (existing storage system as the data migration source). Migration target data is migrated from the second storage system to the first storage system while the first storage system receives an access request (read request and/or write request) to the migration target data from the host. If the first storage system receives an access request to the migration target data which has not yet been migrated, it issues a read request to the second storage system in order to read data of the portion that is required for processing the received access request. The first storage system processes the foregoing received access request by using data that was acquired in response to the read request.

Moreover, for example, storage virtualization technology is also known. According to storage virtualization technology, the second storage system is coupled to the first storage system, and a storage area of the second storage system is provided to the host as a storage area of the first storage system. If the first storage system receives an access request from the host, whether the access destination according to the access request is the storage area of the first storage system or the storage area of the second storage system is specified, and, if the specified access destination is the storage area of the second storage system, the access request is transferred to the second storage system.

In addition, for example, thin provisioning is also known. Accordingly to thin provisioning, a virtual logical volume (hereinafter referred to as the "TP volume") configured from a plurality of virtual pages (virtual storage areas) and a pool configured from a plurality of physical pages (physical storage areas) are defined. An unassigned physical page is assigned to the virtual page in response to writing into the unassigned virtual page.

Patent Literature 2 discloses technology of using a storage area of the second storage system comprising a thin provisioning function in the first storage system based on storage virtualization technology.

CITATION LIST

Patent Literature

[PTL 1]
U.S. Pat. No. 6,108,748
[PTL 2]
Japanese Patent Application Publication No. 2010-055557

SUMMARY OF INVENTION

Technical Problem

In the ensuing explanation, data that is meaningless to the host (for example, default value date which is not written and read for an application program executed by host, such as zero data as data in which all bits are configured from 0) is referred to as "invalid data," and data that is significant to the host (for example, data that is read and/or written by an application program that is executed by the host) is referred to as "valid data."

Upon migrating data from the TP volume, invalid data of an unassigned virtual page of the migration source volume is transferred from the storage system of the migration source to the storage system of the migration destination. Thus, even if the total amount of data stored by one or more physical pages assigned to the TP volume is less than the TP volume, data in the amount of the capacity of the TP volume is migrated.

Moreover, with the migration destination volume also, in the case of a TP volume, a physical page is assigned to a virtual page of the migration destination even if the data that is transferred to the virtual page of the migration destination is invalid data. Thus, the storage capacity that is used by the migration destination storage system will increase uneconomically.

An object of this invention is to reduce the total amount of the migration target data and the storage capacity that is used in the storage system of the migration destination during the data migration from a logical volume in the first storage system associated with an external volume in the second storage system to the TP volume in the second storage system, and to enable such data migration to be executed while receiving an access request to the migration target data from the host.

Solution to Problem

The data migration system includes: a first storage system; a second storage system coupled to the first storage system; and a host system including a host computer coupled to the first and second storage systems.

The first storage system comprises a migration source volume which is a first upper level logical volume which is recognized by the host computer, a first lower level logical volume which is a virtual logical volume, associated with the migration source volume and following thin provisioning, and which is configured from a plurality of virtual areas, a first pool which is a storage area configured from a plurality of first physical areas, and first thin provisioning information of the migration source volume. The first thin provisioning information is information containing information representing which first physical area is assigned to each virtual area of the first lower level logical volume. Upon receiving a write request designating the migration source volume, the first storage system assigns the first physical area from the first pool to a virtual area of a write destination in the first lower level logical volume of the migration source volume, writes write target data into the first physical area, and updates the first thin provisioning information.

The second storage system comprises a migration destination volume which is a second upper level logical volume which is recognized by the host computer, a second lower level logical volume which is a virtual logical volume which is associated with the migration destination volume, a copy destination volume which is a third upper level logical volume which configures a pair with the migration destination volume and in which the migration destination volume is a copy source, a third lower level logical volume which is a virtual logical volume, associated with the copy destination volume and following thin provisioning, and which is configured from a plurality of virtual areas, and a second pool which is a storage area configured from a plurality of second physical areas.

The data migration system performs the following processing.

(A) The second storage system maps the migration source volume to the second lower level logical volume according to storage virtualization technology.

(B) The host system switches an access path from the host computer from an access path to the migration source volume to an access path to the migration destination volume, and, if the second storage system thereby receives an access request designating the migration destination volume from the host computer, access according to the access request is made to the migration source volume via the second lower level logical volume.

(C) The second storage system acquires information contained in the first thin provisioning information.

(D) The second storage system executes copy processing of migrating data from the migration source volume to the migration destination volume and copying the data from the migration destination volume to the third lower level logical volume through the copy destination volume.

(E) The second storage system, after completing the copy processing, associates the third lower level logical volume with the migration destination volume in substitute for the second lower level logical volume.

The second storage system receives a write request designating the migration destination volume from the host computer even during the copy processing, and, upon receiving the write request designating the migration destination volume from the host computer during the copy processing, transfers the write request designating the migration source volume to the first storage system.

In the copy processing, a virtual area to which the first physical area is assigned is specified based on the information acquired at (C) above, data in the first physical area that is assigned to the virtual area is migrated, and data regarding a virtual area to which the first physical area is not assigned is not migrated. The specified virtual area is a virtual area to which data has not yet been migrated even once in the copy processing, or a virtual area that is newly designated, after the migration of data, as a write destination of data by the host computer through the migration destination volume.

As one method of migrating data between the storage systems, there is synchronous remote copy. Synchronous remote copy is, for example, as follows. Specifically, a pair is configured between a certain logical volume X of a certain storage system X and a certain logical volume Y of a separate storage system Y. When the storage system X receives a write request designating the logical volume X from the host computer, the response to the write request can be returned to the host computer upon completing (a) and (b) below.

(a) The storage system X writes the write target data into the logical volume X (or the cache memory of the storage system X).

(b) The storage system X transfers the write target data to the storage system Y and receives a prescribed response from the storage system Y.

Preferably, the number of pairs that are configured concurrently in the synchronous remote copy is restricted. This is because if the number of pairs that are configured in the synchronous remote copy is high, the access performance of the storage system X (for instance, number of access requests that can be processed per unit time) will deteriorate. Further, in the case of a combination of external coupling and internal copy, it can be difficult to receive a limitation of whether to migrate or not according to the function application status of the storage device system having the migration source volume. Due to the reasons such as performance and so forth, the remote copy function has a limitation in number of copy pairs. If the remote copy function is already applied to the migration source volume, it can be difficult to add and apply the remote copy function for migration.

Thus, according to one aspect of the present invention, data migration between the storage systems is performed based on a combination of external coupling (volume mapping according to storage virtualization technology) and internal copy (copy from the migration destination volume to the copy destination volume in the second storage system). The number of external couplings and the number of pairs that are configured concurrently in the internal copy may be greater than the number of pairs that are configured concurrently in the synchronous remote copy. Consequently, efficient data migration can be expected in the storage virtualization environment.

Advantageous Effects of Invention

According to the present invention, it is possible to reduce the total amount of the migration target data and the storage capacity that is used in the storage system of the migration destination during the data migration from a logical volume in the first storage system associated with an external volume in the second storage system to the TP volume in the second storage system, and to enable such data migration to be executed while receiving an access request to the migration target data from the host.

BRIEF DESCRIPTION OF DRAWINGS

FIG. 4 shows the configuration of the logical volume management information 60.

FIG. 5 shows the configuration of the virtual volume management information 61.

FIG. 10 shows the configuration of the pool management information 65.

FIG. 14 shows the configuration of the copy management information 67.

DESCRIPTION OF EMBODIMENTS

Certain embodiments of the present invention are now explained with reference to the attached drawings.

Note that, in the ensuing explanation, various types of information may be explained using an expression such as "xxx table" or "xxx list," but the various types of information may be expressed as a data structure other than tables and lists. In order to show that various types of information are not dependent on a data structure, the expression "xxx table" and "xxx list" can be referred to as "xxx information."

Moreover, in the ensuing explanation, a number is used as the identifying information of various types of targets, but a different type of identifying information other than a number (for instance, an identifier including an alphabetical character or symbol) may also be used.

Moreover, in the ensuing explanation, there are cases where processing is explained with "program" as the subject. Since a program performs predetermined processing while appropriately using a storage resource (a memory, for example) and/or a communication interface device (a communication port, for example) as a result of being executed by a processor (a CPU (Central Processing Unit), for example), the subject of the processing may also be the processor. Processing that is explained with a program as the subject may be processing that is performed by a storage system or its controller. Furthermore, the processor may include a hardware circuit for performing a part or all of the processing to be performed by the processor. A computer program may be installed from a program source into the respective computers. A program source may be, for example, a program distribution server or a storage media.

First Embodiment

Figure 1:
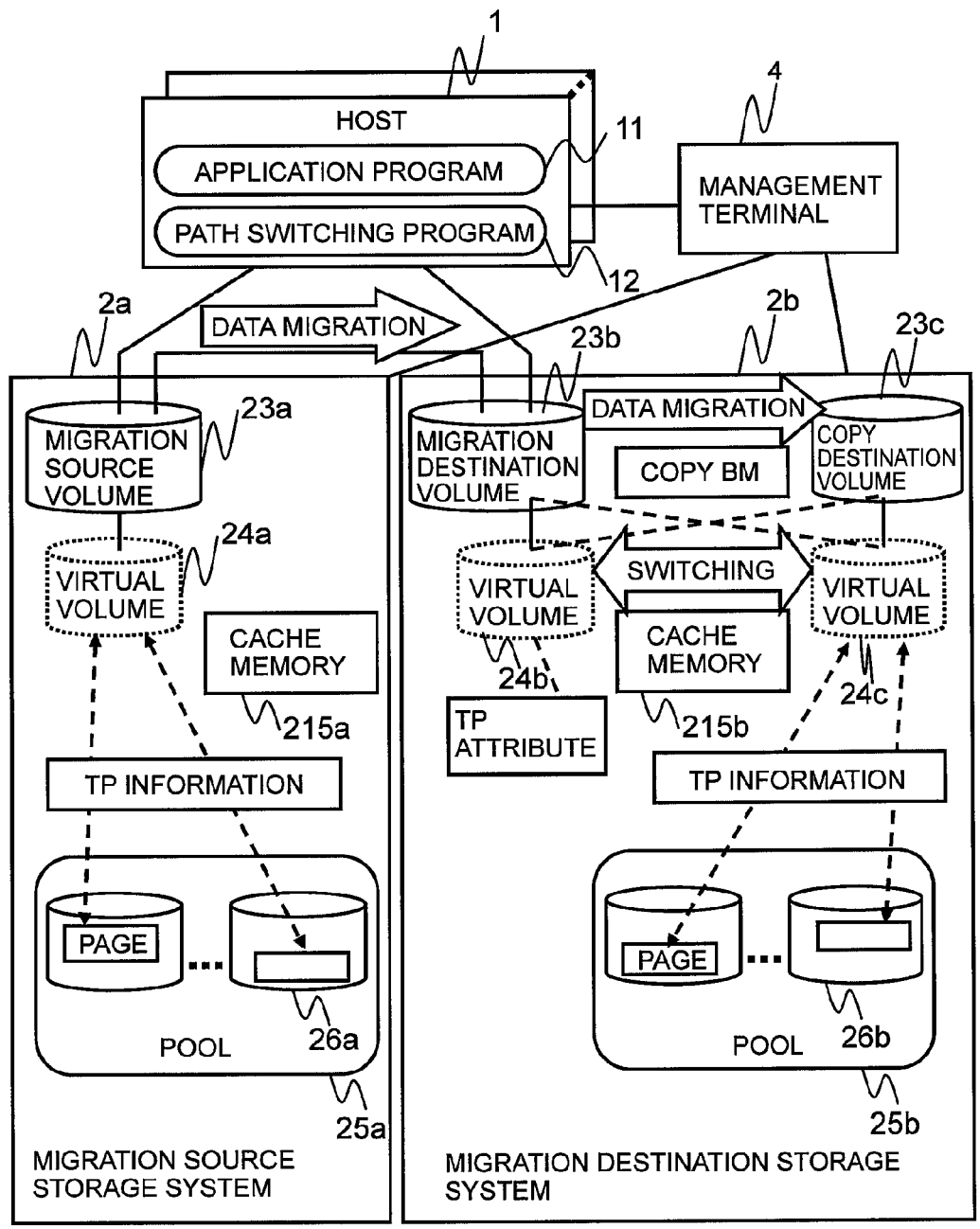
FIG. 1 shows the outline of the first embodiment according to the present invention.

FIG. 1 shows the outline of the first embodiment according to the present invention. Note that, in the ensuing explanation, thin provisioning is abbreviated as "TP".

A migration source storage system 2a as a data migration source and a migration destination storage system 2b as a data migration destination are coupled to a host computer (hereinafter referred to as the "host") 1. In addition, the migration source storage system 2a, the migration destination storage system 2b, and the host 1 are coupled to a management terminal 4. The management terminal 4 manages the host 1 and the storage systems 2a and 2b.

An application program 11 and a path switching program 12 run in the host 1. The path switching program 12 switches the volume as the destination of the access request from the application program 11. The switching is performed transparent to the application program 11 (without being recognized by the application program 11).

The storage system 2a (2b) comprises a cache memory 215a (215b) for temporarily storing data to be written into a logical volume or data that was read from a logical volume.

The outline of data migration according to the first embodiment is as follows.

(1) A migration source volume 23a of the migration source storage system 2a is defined as a migration destination volume 23b of the migration destination storage system 2b. Specifically, the migration source volume 23a is mapped to a virtual volume 24b of the migration destination volume 23b as an external volume according to storage virtualization technology.

(2) The access destination from the host 1 is switched from the migration source volume 23a to the migration destination volume 23b. Specifically, the path switching program 12 switches a logical volume to be associated with an LU (Logical Unit), which is recognized by the application program 11, from the migration source volume 23a to the migration destination volume 23b.

(3) A certain logical volume (hereinafter referred to as the "copy destination volume") 23c is defined as the copy destination of the migration destination volume 23b.

(4) Data is migrated from the virtual volume 24a associated with the migration source volume 23a to the virtual volume 24b associated with the migration destination volume 23b based on the TP information (hereinafter referred to as the "migration source TP information") in the migration source storage system 2a. Since data is migrated based on the migration source TP information, the data that is migrated will only be valid data (that is, only data in a physical page assigned to the virtual volume 24a). A physical page is assigned to the virtual volume 24a from a pool (hereinafter referred to as the "migration source pool") 25a in the migration source storage system 2a. The migration source pool 25a is configured, for example, from one or more real volumes 26a. Each real volume 26a is divided into one or more physical pages. Note that, in the first embodiment, a "real volume" is a logical volume based on a physical storage device (hereinafter referred to as the "drive") in the storage system. A real volume configuring the pool is sometimes referred to as a "pool volume". Moreover, in the first embodiment, a "virtual volume" is a volume management unit in the storage system 2. A virtual volume could also be a TP volume. A TP volume is a virtual logical volume that follows TP, and is configured from a plurality of virtual pages. Furthermore, "TP information" contains information representing which physical page is assigned to which virtual page. In this embodiment, the TP volumes are the virtual volumes 24a and 24c.

(5) Data that was migrated to the virtual volume 23b associated with the migration destination volume 23b is copied from the migration destination volume 23b to the copy destination volume 23c. Data is thereby written into the virtual volume 24c associated with the copy destination volume 23c. In accordance with the above, a physical page is assigned to the virtual volume 24c from a pool (hereinafter referred to as the "migration destination pool") 25b in the migration destination storage system 2b, and data is written into that physical page. Here, the TP information (hereinafter referred to as the "migration destination TP information") in the migration destination storage system 2b is updated.

(6) After the copying of data from the migration destination volume 23b to the copy destination volume 23c is complete, virtual volume switching (change of association between the logical volume and the virtual volume) is performed. Specifically, the virtual volume 24c associated with the copy destination volume 23c is associated with the migration destination volume 23b in substitute for the copy destination volume 23c. Meanwhile, the virtual volume 24b associated with the migration destination volume 23b is associated with the copy destination volume 23c in substitute for the migration destination volume 23b.

As a result of (1) to (6) above, data in a physical page assigned to the virtual volume 24a in the migration source pool 25a is migrated to the migration destination pool 25b.

Figure 2:
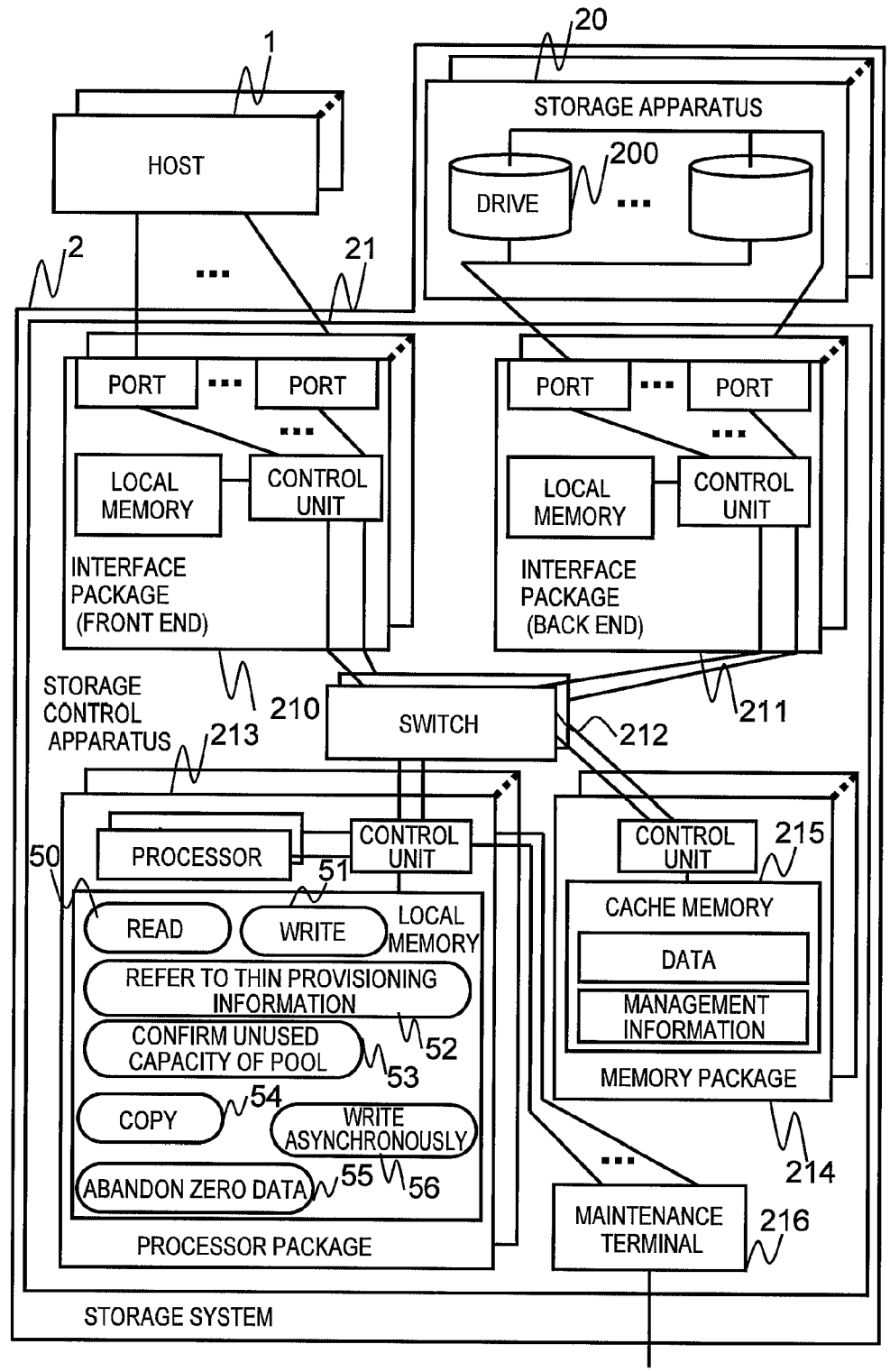
FIG. 2 shows the configuration of the storage system 2a (2b).

FIG. 2 shows the configuration of the storage system 2a (2b).

The storage system 2a (2b) comprises a plurality of physical storage devices and a controller coupled thereto. Specifically, for example, the storage system 2a (2b) comprises a storage apparatus 20 for storing a disk drive 200 as a storage apparatus. In addition, the storage system 2a (2b) comprises a storage control apparatus 21 as a storage control apparatus. The storage control apparatus 21 comprises, for example:

(*) an interface package (front end) 210 coupled to the host 1;

(*) an interface package (back end) 211 coupled to the storage apparatus 20;

(*) a processor package 213 including one or more processors (CPU, for example);

(*) a memory package 214 including a cache memory 215;

(*) a maintenance terminal 216 coupled to the processor package; and (*) a switch 212 (a crossbar switch, for example) coupled to the packages 210, 211, 213 and 214 for switching the coupling between the packages.

A different type of coupling part (a bus for example) may also be adopted in substitute for the switch 212. The maintenance terminal 216 may be omitted. The maintenance terminal 216 may be coupled, for example, to the management terminal 4 (refer to FIG. 1).

The storage apparatus 20 comprises one or more disk drives 200. Each drive 200 includes a plurality of I/O ports. The storage system 2a (2b) may comprise a plurality of storage apparatuses 20. In addition, a different type of physical storage device (for example, a solid state drive or a flash memory) may be adopted in substitute for or in addition to the drive 200.

The front end 210 controls the data transfer between the host 1 and the cache memory 215. The front end 210 may issue an access request to another storage system in addition to receiving an access request from the host 1. The back end 211 controls the data transfer between the cache memory 215 and the drive 200. The front end 210 and the back end 211 may internally comprise an I/O port, a local memory, and a data transfer control unit. A plurality of front ends 210 and back ends 211 may be provided.

The processor package 213 may comprise a plurality of processors, a local memory, and a data transfer control unit. The local memory may store computer programs to be executed by the processor. Specifically, the local memory may store, for example, a read program 50, a write program 51, a TP information referral program 52, a pool unused capacity confirmation program 53, a copy program 54, a zero data abandonment program 55, and an asynchronous write program 56.

The memory package 214 comprises a cache memory 215 and a data transfer control unit. The cache memory 215 may store the management information of the storage system 2. The cache memory 215 temporarily stores data to be written into the drive 200 (physical storage device to become the basis of the logical volume) or data that was read from the drive 200.

A plurality of processor packages 213 and memory packages 214 may be provided.

The maintenance terminal 216 may be used to change the configuration of the storage system 2 or refer to the internal state of the storage system 2. Moreover, the maintenance terminal 216 may relay commands from the management terminal 4 to the storage system 2. The maintenance terminal 23 may be coupled to the processor package 213.

Figure 3:
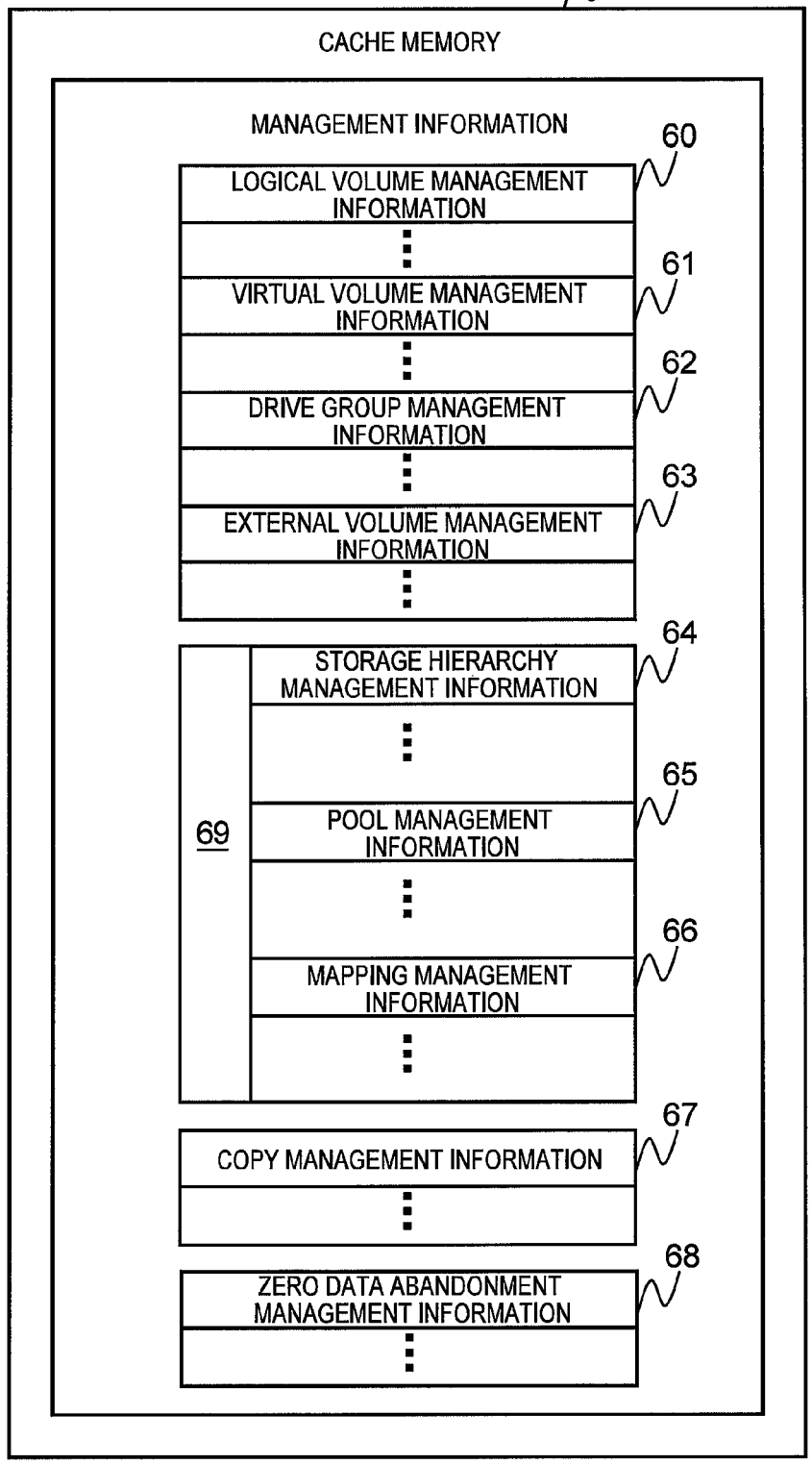
FIG. 3 shows the management information contained in the storage system 2a (2b).

FIG. 3 shows the management information contained in the storage system 2a (2b).

The management information is information containing information concerning the hierarchy management of the logical volumes (for example, information representing the hierarchy to which the logical volume belongs). The management information contains, for example, the following information:

(*) logical volume management information 60 concerning the logical volume;

(*) virtual volume management information 61 concerning the virtual volume;

(*) drive group management information 62 concerning the drive group;

(*) external volume management information 63 concerning the external volume;

(*) TP information 69 concerning TP;

(*) copy management information 67 concerning copy management; and (*) zero data abandonment management information 68 concerning zero data abandonment.

The TP information 69 contains, for example, the following information:

(*) storage hierarchy management information 64 concerning storage hierarchy;

(*) pool management information 65 concerning the pools; and (*) mapping management information 66 concerning the correspondence of a virtual page and a physical page.

FIG. 4 shows the configuration of the logical volume management information 60.

The logical volume 23 is the unit of storage areas to be provided by the storage system 2 to the host 1 or other storage systems 2. The logical volume management information 60 is information which exists, for example, for each logical volume. Upon taking an example of one logical volume (referred to as the "target logical volume" in the explanation of FIG. 4), the logical volume management information 60 contains, for example, the following information:

(*) "logical volume number" as a number of the target logical volume;

(*) "capacity" representing the storage capacity of the target logical volume;

(*) "status" representing the status of the target logical volume (values of the "status" include, for example, "normal," "blocked," and "unused");

(*) "host definition information list";

(*) "virtual volume number" as a number of the virtual volume associated with the target logical volume;

(*) "read/write inhibition flag" representing whether to inhibit the read and/or write to the target volume;

(*) "read/write inhibition range" representing the range that the read and/or write is inhibited in the target volume; and (*) "attribute" showing whether the target logical volume is a normal volume or a pool volume configuring a pool.

The "host definition information list" may contain information (for example, name or port specific information of the host 1) for specifying the host (referred to as the "host 1" in the explanation of FIG. 4) of the access request source when viewed from the target logical volume. Moreover, the "host definition information list" may contain information (for example, identifying information of the port of the target storage system 2, LUN (Logical Unit Number) of the logical volume, or the like) for specifying the target logical volume of the access request destination when viewed from the host 1.

FIG. 5 shows the configuration of the virtual volume management information 61.

The virtual volume 24 is a volume management unit in the storage system 2.

The virtual volume management information 61 is information that exists, for example, for each virtual volume. Upon taking an example of one virtual volume (referred to as the "target virtual volume" in the explanation of FIG. 5), the virtual volume management information 61 contains, for example, the following information:

(*) "virtual volume number" as a number for identifying the target virtual volume;

(*) "capacity" representing the storage capacity of the target virtual volume;

(*) "status" ("normal," "blocked," "unused") representing the status of the target virtual volume;

(*) "cache memory operational status" showing whether data to be read and/or written to the target virtual volume can be retained in the cache memory 215;

(*) "storage location" showing whether the storage area corresponding to the target virtual volume is inside or outside the storage system including the target virtual volume;

(*) "TP attribute" showing whether the target virtual volume is a TP volume;

(*) "drive group number" representing the drive group based on the target virtual volume, "external volume number" as a number of the external volume corresponding to the target virtual volume, and "mapping management number" representing the number of the mapping management information 68 corresponding to the target virtual volume;

(*) "top address" and "end address" representing the top and end addresses of the target virtual volume in the storage area of the drive group if the target virtual volume is based on a drive group; and (*) "zero data abandonment execution status" ("in execution," "non-execution") representing the execution status of zero data abandonment.

The term "zero data abandonment" refers to determining whether the data in a physical page assigned to a TP volume is zero data, and, if the determination result is affirmative, releasing the assignment of that physical page. A valid value of the "zero data abandonment execution status" (for example, "in execution" or "non-execution") is set when the value of the "TP attribute" corresponding to the target virtual volume is "YES".

Figure 6:
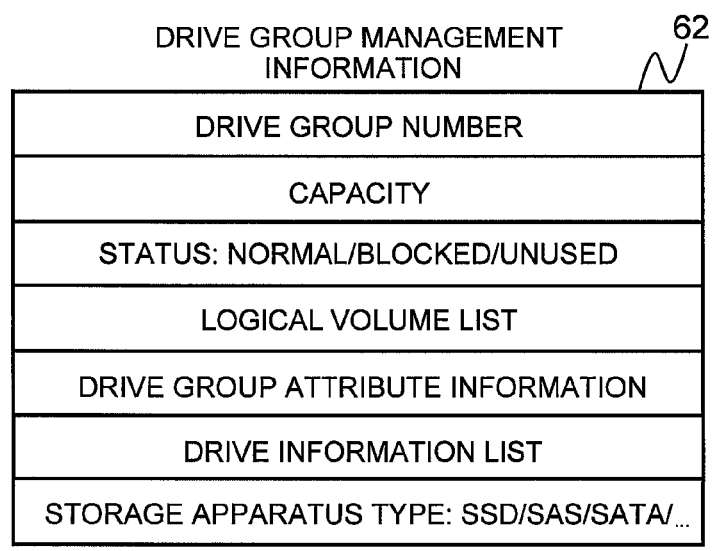
FIG. 6 shows the configuration of the drive group management information 62.

FIG. 6 shows the configuration of the drive group management information 62.

A "drive group" is an aggregation of areas of a plurality of drives 200 for distributing and storing data of the logical volume in a plurality of drives. A drive group is, for example, a RAID (Redundant Array of Independent (or Inexpensive) Disks) group.

The drive group management information 62 is information which exists, for example, for each drive group. Upon taking an example of one drive group (referred to as the "target drive group" in the explanation of FIG. 6), the drive group management information 62 contains, for example, the following information:

(*) "drive group number" as a number for identifying the target drive group;

(*) "capacity" representing the storage capacity of the target drive group;

(*) "status" ("normal," "blocked," "unused") representing the status of the target drive group;

(*) "logical volume list" as a number list of the logical volumes based on the target drive group;

(*) "drive group attribute information" as information containing information (for example, RAID configuration information (RAID level, number of data drives, number of parity drives, stripe size and the like)) concerning the configuration of the target drive group;

(*) "drive information list" as a number list of the drives configuring the target drive group; and (*) "storage apparatus type" (SSD/SAS/SATA or the like) representing the type of the respective drives configuring the target drive group.

The drive information list is information of the areas assigned to the target drive group in the respective drives 200 and contains, for example, a drive number, start address of the area in the target drive 200, capacity and the like.

Figure 7:
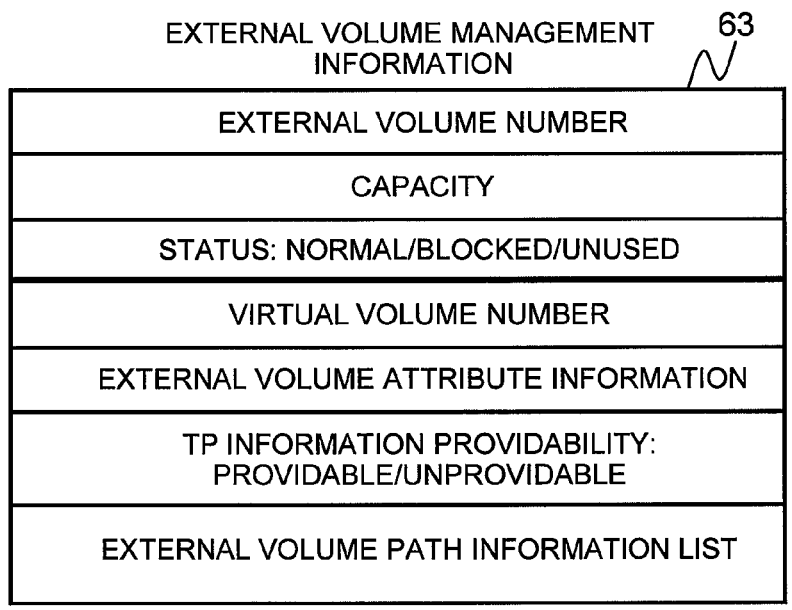
FIG. 7 shows the configuration of the external volume management information 63.

FIG. 7 shows the configuration of the external volume management information 63.

The "external volume" is a virtual volume that was defined to the effect that the substance of the virtual volume is a virtual volume in another storage system.

The external volume management information 63 is information which exists, for example, for each external volume. Upon taking an example of one external volume (referred to as the "target external volume" in the explanation of FIG. 7), the external volume management information 63 contains, for example, the following information:

(*) "external volume number" as a number for identifying the target external volume;

(*) "capacity" representing the storage capacity of the target external volume;

(*) "status" ("normal," "blocked," "unused") representing the status of the target external volume;

(*) "virtual volume number" as a number of the virtual volume corresponding to the target external volume;

(*) "external volume attribute information" representing the attribute of the target external volume;

(*) "TP information providability" ("providable," "unprovidable") representing whether the TP information can be provided to the storage system including the target external volume; and (*) "external volume path information list" as information representing the path to the target external volume.

The "external volume attribute information" may contain, for example, information for uniquely specifying the target external volume (for example, a serial number of another storage system, a volume number in another storage system).

Figure 8:
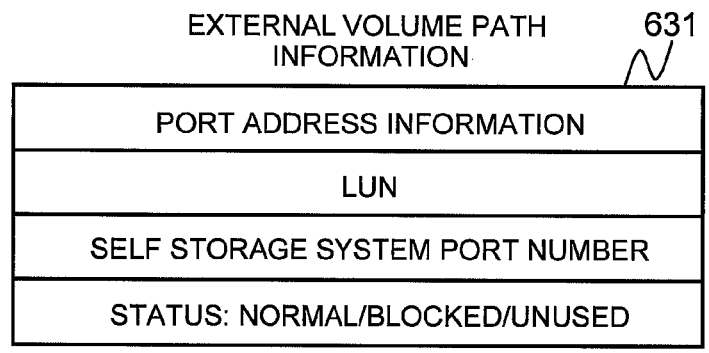
FIG. 8 shows the configuration of the external volume path information 631.

FIG. 8 shows the configuration of the external volume path information 631.

The external volume path information 631 is information that is contained in the "external volume path information list" shown in FIG. 7, and is information which exists, for example, for each path to the external volume (hereinafter referred to as the "external volume path"). Upon taking an example of one external volume path (referred to as the "target external volume path" in the explanation of FIG. 8), the external volume path information 631 contains, for example, the following information:

(*) "port address information" representing the address of the port of the storage system including the target external volume;

(*) "LUN" as a number of the logical volume associated with the target external volume;

(*) "self storage system port number" as a number of the port of the storage system including the virtual volume corresponding to the target external volume; and (*) "status" ("normal," "blocked," "unused") representing the status of the target external volume path.

The target external volume path may be configured, for example, from the "port address information," the "LUN" and the "self storage system port number".

Figure 9:
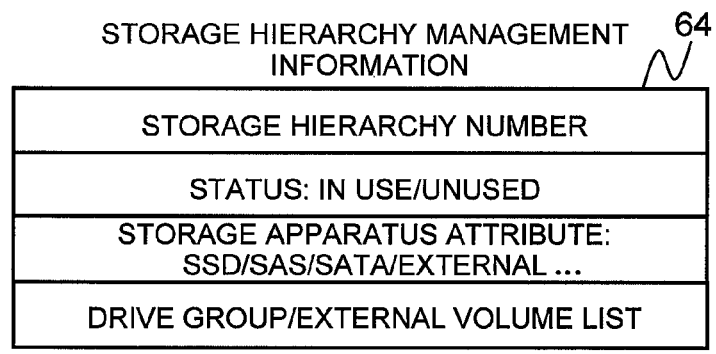
FIG. 9 shows the configuration of the storage hierarchy management information 64.

FIG. 9 shows the configuration of the storage hierarchy management information 64.

The storage hierarchy management information 64 is information which classifies the storage apparatuses 20 based on access performance regarding the storage apparatuses 20 in the storage system containing the information 64, or the storage apparatuses 20 in another storage system 2 that is externally coupled to that storage system based on storage virtualization technology. The storage hierarchy management information 64 exists for each storage hierarchy. Upon taking an example of one storage hierarchy (referred to as the "target storage hierarchy" in the explanation of FIG. 9), the storage hierarchy management information 64 contains, for example, the following information:

(*) "storage hierarchy number" as a number for identifying the target storage hierarchy;

(*) "status" ("used," "unused") representing the status of the target storage hierarchy;

(*) "storage apparatus attribute" representing the type of drives contained in the storage apparatus 20 belonging to the target storage hierarchy; and (*) "drive group/external volume list" as information for specifying the storage apparatus 20 belonging to the target storage hierarchy.

For example, SSD is classified as storage hierarchy 0, SAS drive is classified as storage hierarchy 1, SATA drive is classified as storage hierarchy 2, and external volume is classified as storage hierarchy 3. Note that the type of storage hierarchy (tier) may be defined from a different perspective in substitute for or in addition to the access performance.

FIG. 10 shows the configuration of the pool management information 65.

The pool management information 65 is information of the pool volume configuring the pool and information for managing the overall capacity and status of the target pool. The pool management information 65 is information which exists, for example, for each pool. Upon taking an example of one pool (referred to as the "target pool" in the explanation of FIG. 10), the pool management information 65 contains, for example, the following information:

(*) "pool number" as a number for identifying the target pool;

(*) "pool attribute" (TP/snapshot, etc.) showing the intended usage of the target pool;

(*) "page size" as the size of the physical page configuring the target pool;

(*) "status" ("normal," "blocked," "unused") representing the status of the target pool (*) "overall information";

(*) "storage hierarchy information";

(*) "pool volume list" as number list of the pool volumes configuring the target pool; and (*) information ("page management information unused queue header" and "page management information") for managing the assignment of the target pool to the virtual volume.

The "page management information unused queue header" is, for example, a pointer of the queue of the unassigned physical page (unused physical page) to the header. The "page management information" is information concerning the physical page. The "page management information" will be described in detail later.

The "overall information" and the "storage hierarchy information" contain the following information regarding the overall system or the storage hierarchy (referred to as the "target range" in this paragraph):

(*) "capacity" representing the storage capacity of the target range;

(*) "used amount" as the total storage capacity of the one or more assigned physical pages in the target range;

(*) "reserved amount" as the total storage capacity of the one or more physical pages in which the subsequent assignment to the target range is reserved;

(*) "utilization threshold (upper limit)" as the upper limit of the ratio (utilization) of the "used amount" relative to the "capacity"; and (*) "utilization threshold (lower limit)" as the lower limit of the ratio (utilization) of the "used amount" relative to the "capacity".

If the utilization exceeds the "utilization threshold (lower limit)," a message urging the addition of a pool is output to the maintenance terminal 216 and/or the management terminal 4. If the utilization exceeds the "used amount threshold (upper limit)," a warning that the pool unused capacity is depleted is output to the maintenance terminal 216 and/or the management terminal 4.

Figure 11:
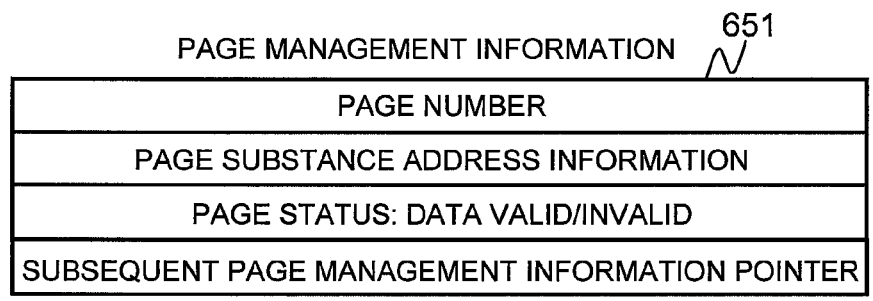
FIG. 11 shows the configuration of the page management information 651.

FIG. 11 shows the configuration of the page management information 651.

The page management information 651 is the "page management information" shown in FIG. 10, and is information which exists, for example, for each physical page. Assignment of the pool 25 to the virtual volume 24 is managed based on the page management information 651 and the mapping information 66. Upon taking an example of one physical page (referred to as the "target physical page" in the explanation of FIG. 11), the page management information 651 contains, for example, the following information:

(*) "page number" as a number for identifying the target physical page;

(*) "page substance address information" as an address of the substance of the storage area of the target physical page (physical storage area as the basis of the target physical page);

(*) "status" ("data valid," "data invalid") representing the status of the target physical page; and (*) "subsequent page management information pointer" as a pointer of subsequent page management information of the page management information corresponding to the target physical page.

Specifically, the page management information is managed in a queue.

Figure 12:
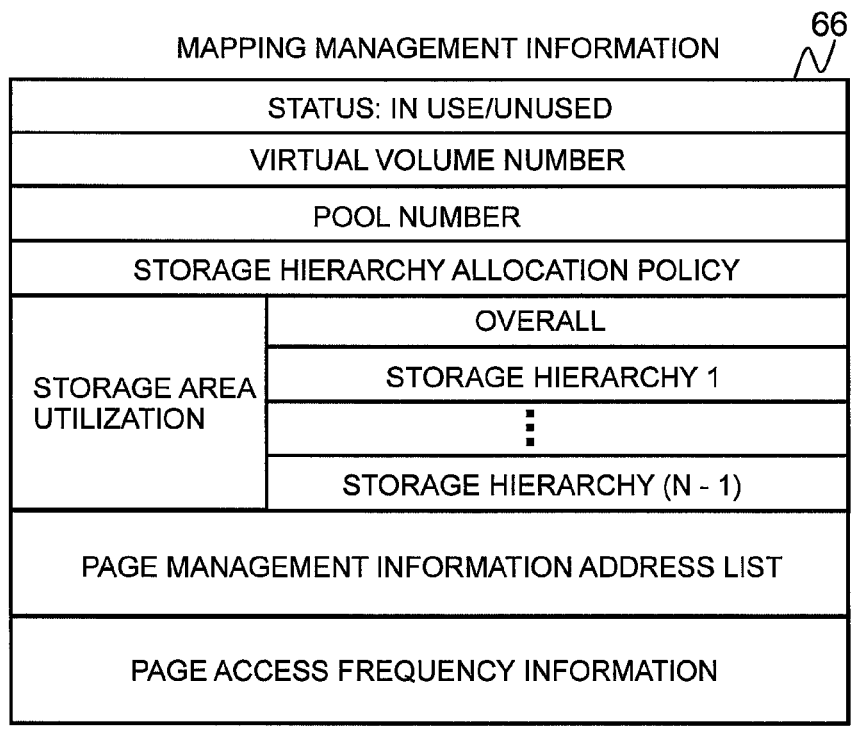
FIG. 12 shows the configuration of the mapping management information 66.

FIG. 12 shows the configuration of the mapping management information 66.

The mapping management information 66 is information which exists for each TP volume. Upon taking an example of one TP volume (referred to as the "target TP volume" in the explanation of FIG. 12), the mapping management information 66 contains, for example, the following information:

(*) "status" ("in use," "unused") representing the status of the mapping management information corresponding to the target TP volume;

(*) "virtual volume number" as a number of the target TP volume;

(*) "pool number" as a number of the pool (pool of the allocation source of the physical page to the target TP volume) to which the target TP volume is associated;

(*) "storage hierarchy allocation policy" representing the allocation priority of the storage hierarchy to which belongs the physical page assigned to the target TP volume;

(*) "storage area utilization" representing the utilization based on the overall target TP volume or each storage hierarchy (ratio of the total capacity of the one or more virtual pages, to which a physical page is assigned, relative to the "capacity" of the target TP volume);

(*) "page management information address list" as a list of the page management information of the physical pages assigned to the target TP volume; and (*) "page access frequency information" representing the access frequency for each target virtual page.

The "access frequency" is the number of accesses (I/O) per unit time (IOPS (I/O per Second)) to the target virtual page.

Figure 13:
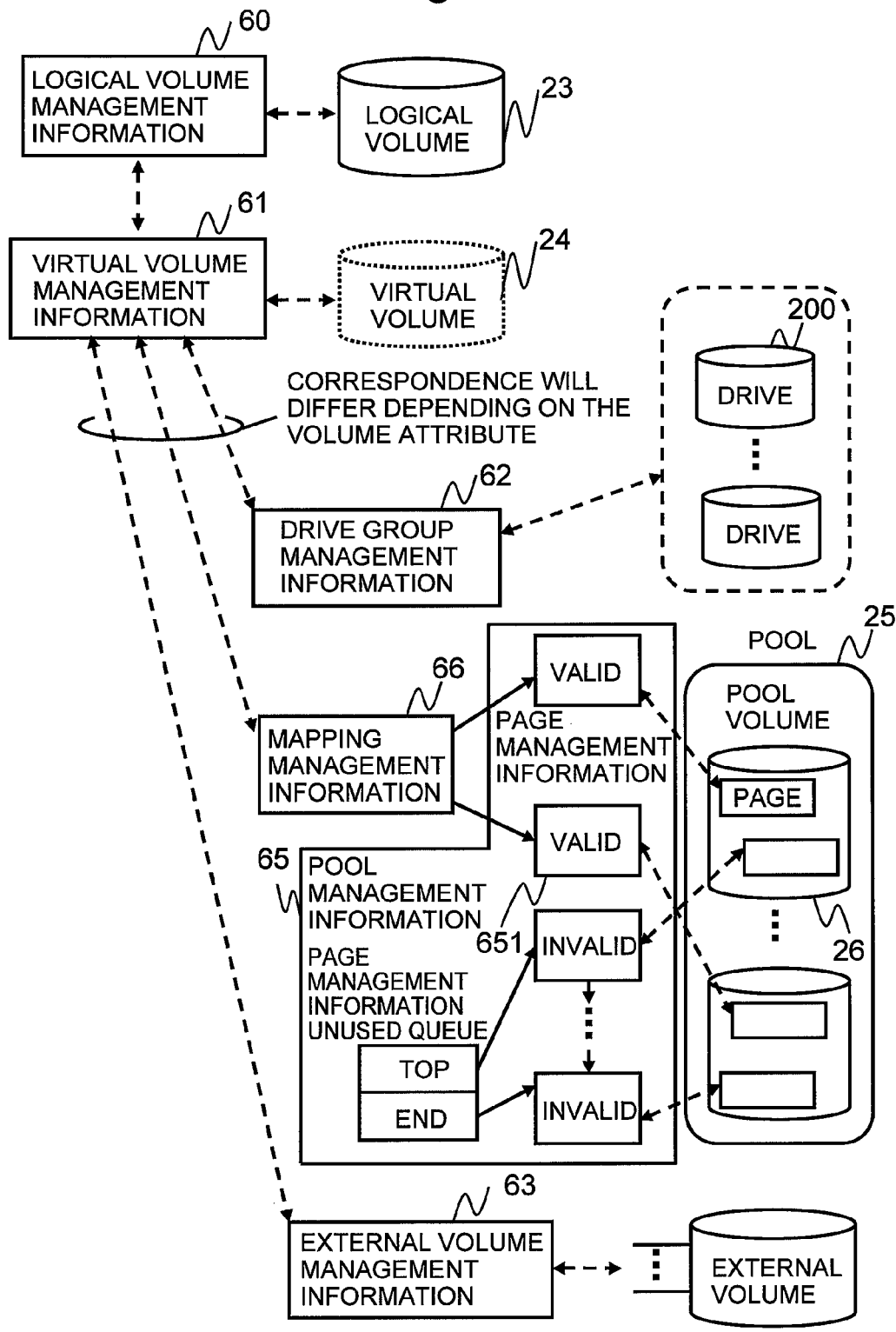
FIG. 13 shows the association of the various types of management information 60, 61, 62, 65, 66 and 63.

FIG. 13 shows the association of the various types of management information 60, 61, 62, 65, 66 and 63.

The logical volume management information 60 and the virtual volume management information 61 correspond. In accordance with the attribute of the virtual volume, one among the drive group management information 62, the mapping management information 66, and the external volume management information 63 will correspond to the virtual volume management information 61.

Moreover, a physical page of the pool 25 is assigned to the virtual volume 24 based on the mapping management information 66 and the page management information 651. The page management information 651 provided for each physical page, which is a unit for allocating the pool volumes 26 configuring the pool 25, is managed by the page management information unused queue in a state where the target physical page is not assigned to the virtual volume. The page management information unused queue may be provided for each storage hierarchy. Moreover, if the physical page is assigned to the TP volume, after valid data is stored in the physical page, the status of the page management information 651 corresponding to that physical page becomes "valid".

FIG. 14 shows the configuration of the copy management information 67.

The copy management information 67 is information for managing the status and progress of the copy processing to be executed during data migration. The copy management information 67 is information which exists for each copy pair (pair of the copy source volume and the copy destination volume). Upon taking an example of one copy pair (referred to as the "target copy pair" in the explanation of FIG. 14), the copy management information 67 contains, for example, the following information:

(*) "copy source volume number" as a number of the copy source volume in the target copy pair;

(*) "copy destination volume number" as a number of the copy destination volume in the target copy pair;

(*) "copy status" ("in execution," "suspended," "unused") representing the execution status of the copy processing in the target copy pair;

(*) "copy BM" ("ON": with difference, "OFF": no difference) as the bitmap for specifying the area which requires copying in the copy target range;

(*) "residual quantity" showing the number of bits of the copy BM that are ON for determining the completion of copy;

(*) "copy mode" ("normal," "TP") showing whether the copy target is a TP volume;

(*) "TP information referral mode" ("individual," "collective") for specifying the referral mode of the TP information if the copy mode is "TP";

(*) "zero data abandonment mode" ("non-execution," "execution during copy," "asynchronous execution") showing the mode of zero data abandonment if the copy mode is "TP"; and (*) "initial copy flag" showing that, after the start of copy, the copy from the top to the end of the copy source volume has not yet been completed.

The respective bits configuring the copy BM correspond to the respective logical areas (blocks or virtual pages) of the copy source volume. If the data in the logical area of the copy source volume and the data in the logical area of the copy destination volume are different, the bit corresponding to the logical area of the copy source volume is turned "ON" (with difference). The difference between the copy source volume and the copy destination volume may be managed based on information of formats other than bitmap.

Moreover, the "residual quantity" may be added according to the update from "OFF" to "ON" or subtracted according to the update from "ON" to "OFF" during the update of the copy BM.

Figure 15:
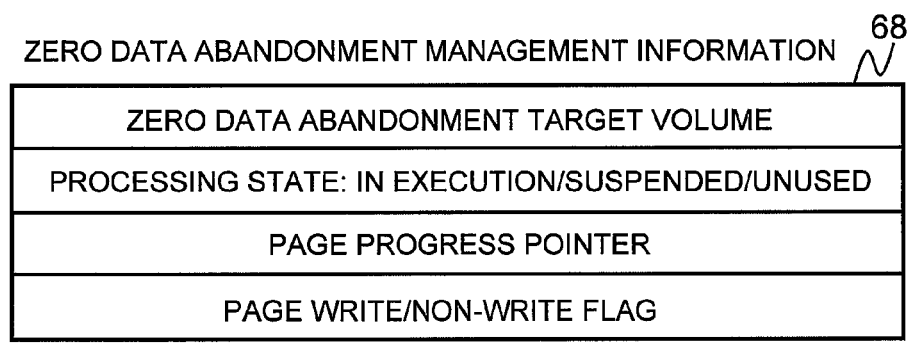
FIG. 15 shows the configuration of the zero data abandonment management information 68.

FIG. 15 shows the configuration of the zero data abandonment management information 68.

The zero data abandonment management information 68 is information for managing the execution status of the zero data abandonment processing (processing of releasing the assignment of a physical page which is an assigned physical page storing zero data) to be executed asynchronously with the data migration. The zero data abandonment management information 68 contains, for example:

(*) "zero data abandonment target volume" as a number of the TP volume to be subject to zero data abandonment;

(*) "status" ("in execution," "suspended," "unused") representing the status of the zero data abandonment processing;

(*) "page progress pointer" representing the address of the latest virtual page to be subject to zero data abandonment; and (*) "page write/non-write flag" showing whether writing was performed in the target virtual page during the zero data confirmation.

The various flows of the processing to be performed in this embodiment are now explained. Note that, in the ensuing explanation, with respect to the elements of the migration source storage system 2a, a symbol "a" may be added to the reference symbol of that element, and, with respect to the elements of the migration destination storage system 2b, a symbol "b" may be added to the reference symbol of that element.

Figure 16:
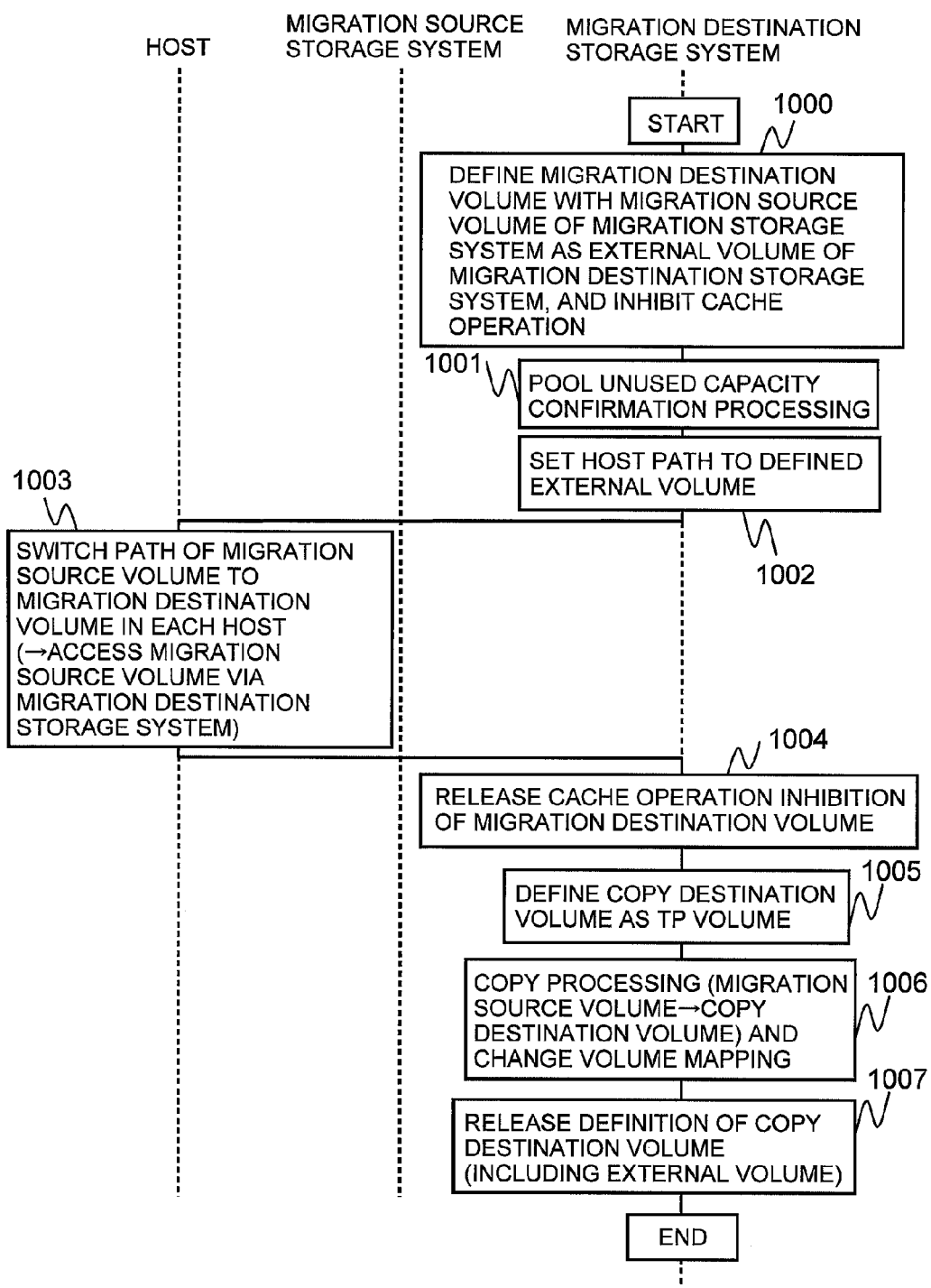
FIG. 16 shows the outline of the flow of the volume migration processing.

FIG. 16 shows the outline of the flow of the volume migration processing.

At the respective steps of FIG. 16, the management terminal 4 issues commands to the host 1, the migration source storage system 2a, or the migration destination storage system 2b.

Foremost, pursuant to a command from the management terminal 4, the migration destination storage system 2b defines the migration destination volume 23b with the migration source volume 23a as the external volume of the migration destination storage system 2b, and inhibits the cache memory operation (step 1000). Specifically, for example, the management terminal 4 notifies information (for example, port specific information or LUN of the migration source storage system 2a) concerning the migration source volume 23a as the access destination of the host 1 to the migration destination storage system 2b as information of the migration target volume. The migration destination storage system 2b allocates unused external volume management information 63b, and registers the information received from the management terminal 4 in the "external volume path information list" (refer to FIG. 7) of the external volume management information 63b. Moreover, the migration destination storage system 2b requests the LUN of the port of the migration source storage system 2a, which is being accessed by the host 1, to send information concerning the migration source volume 23a to which that LUN is assigned, and registers the information contained in the response to that request (response from the migration source storage system 2a) in the "external volume attribute information" (refer to FIG. 7) of the external volume management information 63b. In addition, the migration destination storage system 2b makes an inquiry to the migration source storage system 2a concerning the capacity of the migration source volume 23a, and registers the information (capacity, external volume attribute information) contained in the response to the inquiry as the "capacity" and "external volume attribute information" of the external volume management information 63b. The migration destination storage system 2b allocates the unused logical volume management information 60b and the unused virtual volume management information 61b, mutually associates the same, and additionally associates them with the external volume 24b. Furthermore, the migration destination storage system 2b sets the "cache memory operational status" of the virtual volume management information 61b to "Inhibited". Consequently, even if the access to the migration source volume 23a and access to the migration destination volume 23b coexist, the cache operation is uniformly executed by the migration source storage system 2a. Thus, it is possible to prevent the host 1 from accessing erroneous data.

The pool unused capacity confirmation processing is subsequently executed (step 1001). The pool unused capacity confirmation processing is explained later with reference to FIG. 17 and FIG. 18.

Subsequently, a host path is defined in the migration destination volume 23b as an external volume of the migration destination storage system 2b, and the migration destination storage system 2b is thereby able to receive an access request from the host 1 (step 1002). Specifically, the migration destination storage system 2b registers the path to the migration destination volume 23b (information for specifying the host 1, port specific information or LUN of the migration destination volume 23b) in the "host definition information list" of the logical volume management information 61b.

Subsequently, the host 1 switches the access path to be used from a first access path to the migration source volume 23a of the migration source storage system 2a to a second access path to the migration destination volume 23b of the migration destination storage system 2b (step 1003). During this switching, the path switching program 12 performs, for example, one among the following processing (1) to (3):

(1) process the access request in execution (request received from the application program 11) with the migration source storage system 2a, and transfer the access request newly received from the application program 11 to the migration destination storage system 2b;

(2) process the request in execution with the migration source storage system 2a, retain the newly received request in the path switching program 12, and transfer the retained request to the migration destination storage system 2b after all requests in execution are complete; or (3) once error-end all requests in execution, switch from the first access path to the second access path, and transfer the access request through the second access path to the migration destination storage system 2b during a retry.

Access to the migration destination volume 23b will now reach the migration source volume 23a that is defined as an external volume of the migration destination volume 23b via the migration destination storage system 2b. If there are a plurality of hosts 1, the access path regarding all hosts 1 is switched sequentially.

Subsequently, the migration destination storage system 2b releases the inhibition of the cache memory operation that was inhibited at step 1000 (step 1004).

Subsequently, the migration destination storage system 2b defines the copy destination volume 23c to become the copy destination of the migration destination volume 23b as a TP volume (step 1005). Specifically, for example, the migration destination storage system 2b allocates the unused logical volume management information 60b and the unused virtual volume management information 61b, mutually associates the same, and sets the "TP attribute" of the allocated virtual volume management information 61b to "YES". In addition, the migration destination storage system 2b allocates the unused mapping management information and associates it with the pool to become the assignment destination of the storage area. Moreover, the migration destination storage system 2b allocates the unused copy management information 67, sets the "copy source volume number" as the number of the migration destination volume 23b, sets the "copy destination volume number" as the number of the copy destination volume 23c, and sets "Suspended" as the "copy status" The "TP information referral mode" and the "zero data abandonment mode" are also set.

Subsequently, the copy processing is started (step 1006). The copy processing is described later with reference to FIG. 19 to FIG. 22.

Finally, the migration destination storage system 2b releases the definition of the copy destination volume 23c (step 1007). As a result of the copy processing, the virtual volume 24b is associated with the copy destination volume 23c, and the external volume definition to the migration source volume 23a that was associated with the virtual volume 24b is released.

Figure 17:
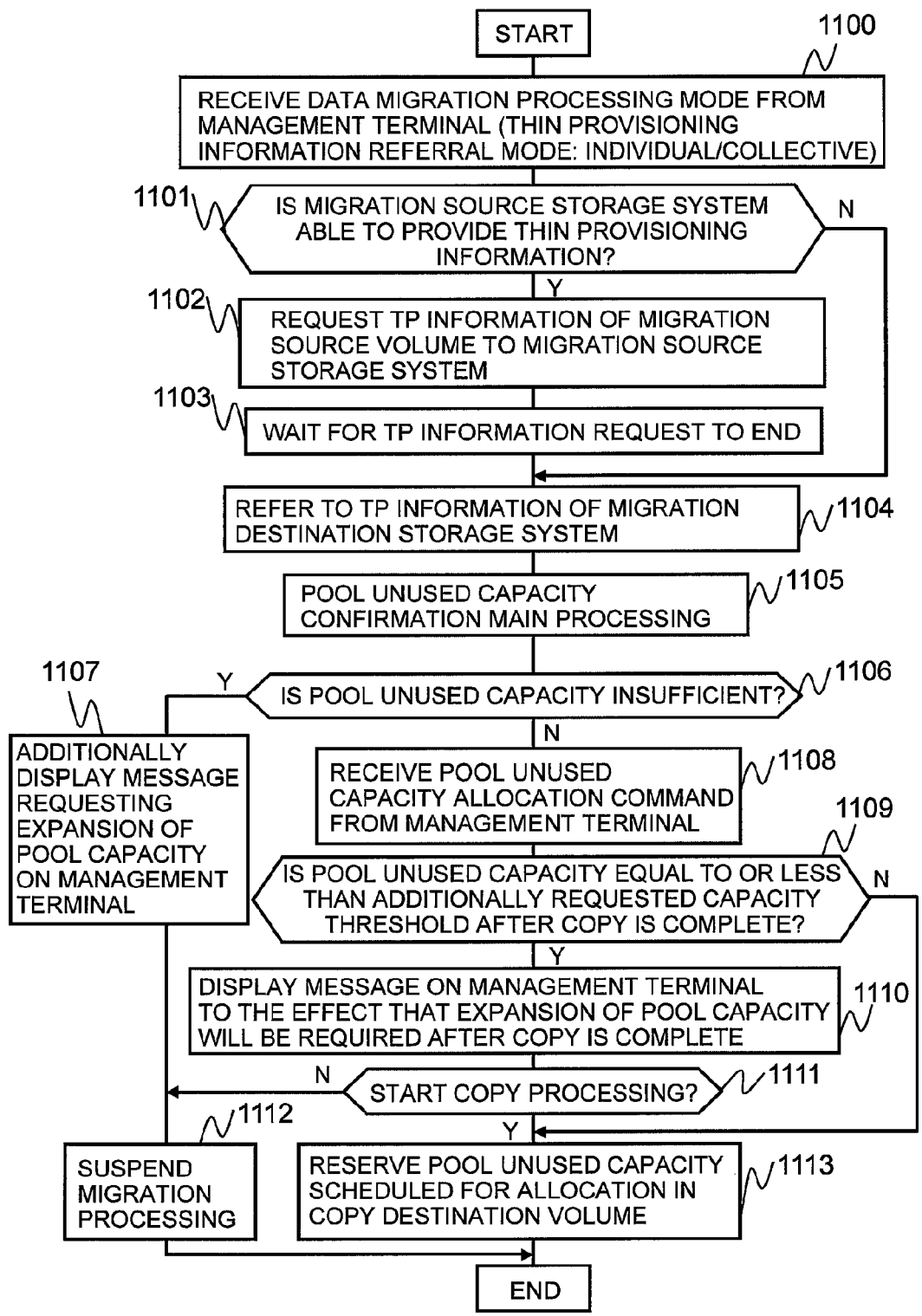
FIG. 17 shows the flow of the pool unused capacity confirmation processing.

FIG. 17 shows the flow of the pool unused capacity confirmation processing to be executed by the migration destination storage system 2b.

Based on a command from the management terminal 4, the processor of the processor package 213 executes the pool unused capacity confirmation program 53. The pool unused capacity confirmation processing shown in FIG. 17 is thereby performed.

The pool unused capacity confirmation program 53 receives a data migration processing mode from the management terminal 4 (step 1100). Specifically, for example, the program 53 selects following (A) or (B) as the "TP information referral mode" (refer to FIG. 14):

(A) "individual" (mode of referring to a part of the TP information of the migration source volume 23a prior to proceeding to the copy processing and making an inquiry regarding the required TP information); or (B) "collective" (mode of referring to all TP information of the migration source volume 23a prior to proceeding to the copy processing) (even in the "collective" mode, the operation will be the same as the "individual" mode after the initial copy).

Subsequently, the program 53 determines whether the migration source storage system 2a is able to provide the TP information (step 1101). Specifically, for example, the program 53 determines whether the migration source storage system 2a includes a TP function based on the name of manufacturer, serial number and other information in the "external volume attribute information" (refer to FIG. 7). If it is difficult to specify whether the migration source storage system 2a includes the TP function, the program 53 determines that it includes the TP function.

If the provision of the TP information is possible (Y at step 1101), the program 53 executes step 1102, and, if the provision of the TP information is not possible (N at step 1101), the program 53 executes step 1104.

Subsequently, the program 53 requests the migration source storage system 2a to send the TP information of the migration source volume 23a (step 1102), and suspends processing until it receives the TP information of the migration source volume 23a from the migration source storage system 2a (step 1103). The migration source storage system 2a receives the request that was issued at step 1102, and thereby performs the TP referral processing. The TP referral processing is explained later with reference to FIG. 30.

Subsequently, the program 53 refers to the TP information of the migration destination storage system 2b (step 1104), and obtains the pool unused capacity.

Subsequently, the program 53 executes the pool unused capacity confirmation main processing (step 1105).

Figure 18:
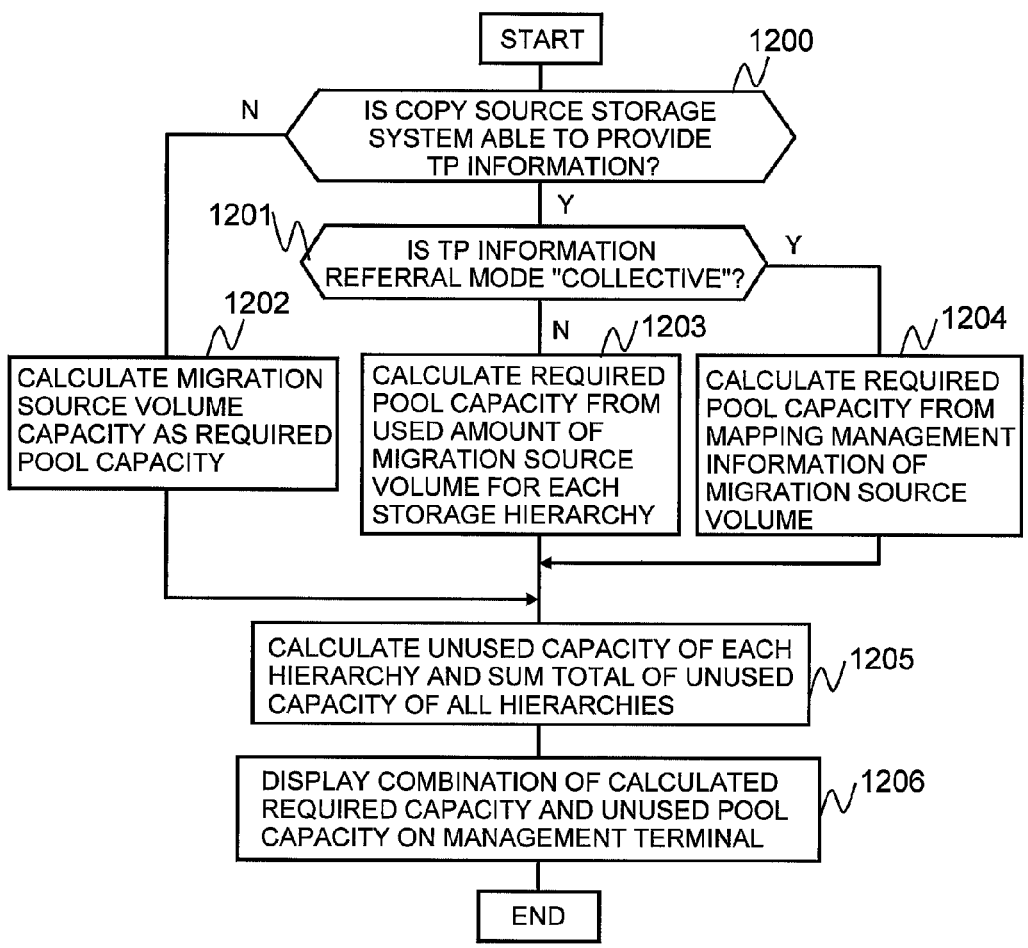
FIG. 18 shows the flow of the pool unused capacity confirmation main processing.

FIG. 18 shows the flow of the pool unused capacity confirmation main processing.

The program 53 determines whether the migration source storage system 2a was able to provide the TP information (step 1200). If the request that was issued at step 1102 is error-ended, it is determined that the provision of the TP information was not possible. Note that the program 53 stores the TP information providability determination result in the external volume management information 63.

If the provision of the TP information is not possible (N at step 1200), the program 53 calculates the pool capacity that is required during the migration of the migration source volume 23a in the migration destination storage system 2b to the capacity of the migration source volume 23a (step 1202). For example, if the capacity of the migration source volume 23a is 100 GB, calculation to the effect that the pool capacity is 100 GB and the storage hierarchy is default (for example, storage hierarchy 2 (SAS)) is carried out.

If the provision of the TP information is possible (Y at step 1200), the program 53 determines whether the TP information referral mode received from the management terminal 4 at step 1100 is "collective" (step 1201).

If the TP information referral mode is not "collective" (N at step 1201), the program 53 calculates the pool capacity that is required during the migration of the migration source volume 23a in the migration destination storage system 2b based on the used amount of the mapping management information 66 of the migration source volume 23a for each storage hierarchy (step 1203). For example, if storage hierarchy 0 (SSD): 10 GB, storage hierarchy 1 (SAS drive): 30 GB, storage hierarchy 2 (SATA drive): 60 GB are specified from the mapping management information 66 of the migration source volume 23a, as the pool capacity that is required during the migration, 10 GB is calculated as the required capacity regarding storage hierarchy 0 (SSD), 30 GB is calculated as the required capacity regarding storage hierarchy 1 (SAS drive), and 60 GB is calculated as the required capacity regarding storage hierarchy 2 (SATA drive), respectively.

Note that if the storage hierarchies of the migration source storage system 2a and the migration destination storage system 2b are different, migration to a storage hierarchy that is similar to the "storage apparatus attribute" of the migration destination storage system 2b is anticipated with reference to the "storage apparatus attribute" of the storage hierarchy management information 64 of the migration source storage system 2a.

If the TP information referral mode is "collective" (Y at step 1201), the program 53 calculates the pool capacity that is required during the migration of the migration source volume 23a in the migration destination storage system 2b for each storage hierarchy based on the mapping management information 66 (for example, number of physical pages that are assigned to the virtual volume 24a) of the migration source volume 23a, and the "page size" of the pool management information 65 (step 1204). Specifically, for example, the program 53 calculates the pool capacity that is required upon copying the data in all pages of the currently assigned migration source volume 23a of the migration source storage system 2a to the migration destination storage system 2b in consideration of the difference in the "page size" of the migration source storage system 2a and the migration destination storage system 2b. For example, if the "page size" of the migration source storage system 2a is greater than the "page size" of the migration destination storage system 2b, a pool capacity of X times (X=(page size of migration destination storage system 2b)/(page size of migration source storage system 2a)) could become required.

Subsequently, the program 53 refers to the pool management information 65 of the migration destination storage system 2b, and calculates, as the pool unused capacity, the pool unused capacity of the respective hierarchies and the total pool unused capacity of all hierarchies (step 1205).

Subsequently, the program 53 displays the information representing the calculated required pool capacity and the pool unused capacity (hereinafter referred to as the "display information") on the management terminal 4, and such information is displayed on the management terminal 4 (step 1206).

Specifically, for example, if the provision of the TP information is not possible (N at step 1200), the display information may be information showing whether the migration source volume 23a can be migrated to a specific storage hierarchy of the migration destination storage system 2a by showing the comparison of the required pool capacity (capacity of the migration source volume 23a) and the pool unused capacity of the respective hierarchies. Moreover, the display information may be information showing whether the migration target data (data in the migration source volume 23a) can be migrated if distributed to a plurality of hierarchies by comparing the required pool capacity and the total pool unused capacity of all hierarchies. In addition, the display information may be information illustrating a storage example upon distributing and storing the migration target data in a plurality of hierarchies. For example, the display information may be information showing that 100 GB of data can be stored if 80% (80 GB) is distributed to the storage hierarchy 2 of the migration destination storage system 2b and 20% (20 GB) is distributed to the storage hierarchy 3.

Moreover, for example, if the provision of the TP information is possible (Y at step 1200), the display information may be information showing the comparison of the required pool capacity of the respective storage hierarchies and the unused pool capacity of the respective hierarchies. Furthermore, the display information may also be information showing whether the migration target data can be stored by changing the hierarchy of its storage destination by showing the comparison of the total required pool capacity of all hierarchies and the total unused pool capacity of all hierarchies. In addition, the display information may also be information illustrating a specific example upon changing the hierarchy of the storage destination. For example, with respect to the migration target data in the migration source storage system 2a, if 10 GB exists in the storage hierarchy 0 and 30 GB exists in the storage hierarchy 1, the display information may be information showing that 40 GB can be stored in the storage hierarchy 1 with the migration destination storage system 2b.

The pool unused capacity confirmation main processing is thereby ended.

Explanation is continued by returning to FIG. 17.

The program 53 determines whether the unused capacity of the pool of the migration destination storage system 2b is insufficient (step 1106).

If the unused capacity of the pool is insufficient (Y at step 1106), the program 53 displays (sends) a message requesting the expansion of the pool capacity on the management terminal 4 (step 1107), and suspends the migration processing (step 1112). Specifically, for example, the program 53 returns the processing at step 1000 to its original state.

If the unused capacity of the pool is not insufficient (N at step 1106), the program 53 receives a pool unused capacity allocation command as the allocation policy in response to the display at step 1206 from the management terminal 4 (step 1108). The program 53 stores the information represented with the received command in the "storage hierarchy allocation policy" of the mapping management information 66.

Subsequently, after the copy is complete, the program 53 determines whether the unused capacity of the pool becomes equal to or less than the capacity addition request threshold (step 1109).

After the copy is complete, if the unused capacity of the pool does not become equal to or less than the capacity addition request threshold (N at step 1109), the program 53 performs step 1113.

After the copy is complete, if the unused capacity of the pool becomes equal to or less than the capacity addition request threshold (Y at step 1109), the program 53 displays (sends) a message on the management terminal 4 to the effect that the pool capacity needs to be expanded after the copy is complete (step 1110), and obtains an input of the final determination of whether to start the copy processing (step 1111).

Upon receiving an input to the effect of not starting (suspending) the copy processing (N at step 1111), the program 53 performs step 1112.

Upon receiving an input to the effect of starting the copy processing (Y at step 1111), the program 53 reserves a pool unused capacity that is scheduled to be assigned to the copy destination volume (step 1113). Specifically, for example, in order to reduce the pool depletion during the copy processing, the program 53 registers the required pool capacity in the "reserved amount" of the pool management information 65, and uses the "reserved amount" as the "used amount" upon calculating the pool unused capacity.

Figure 19:
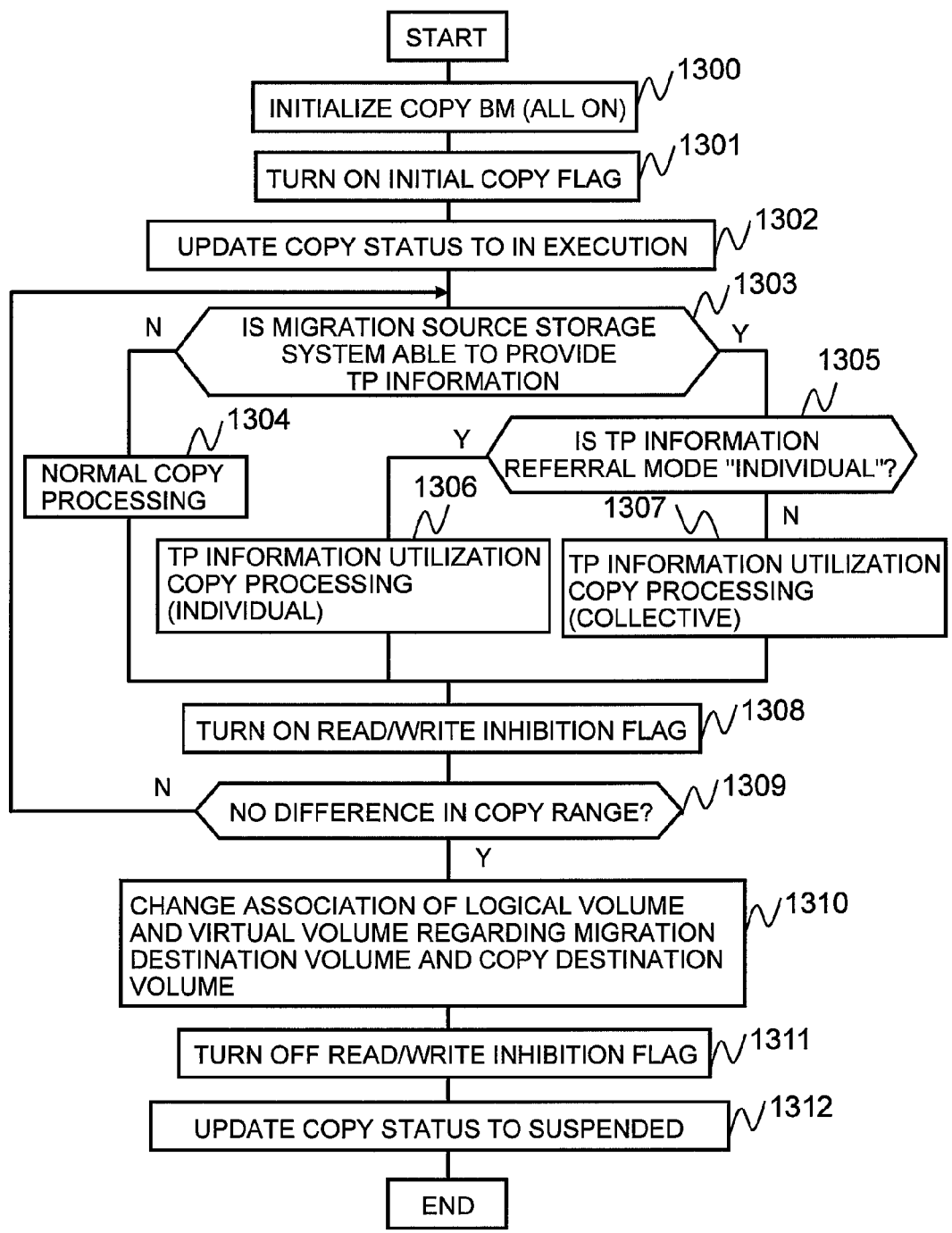
FIG. 19 shows the flow of the copy processing.

FIG. 19 shows the flow of the copy processing.

Based on a command from the management terminal 4, the processor of the processor package 213 executes the copy program 54. The copy processing shown in FIG. 19 is thereby performed.

Foremost, the copy program 54 performs initialization of turning "ON" (with difference) all bits configuring the "copy BM" (refer to FIG. 14) (step 1300).

Subsequently, the copy program 54 updates the "initial copy flag" to "ON" (step 1301). The initial copy flag is referred to and updated in the TP information utilization copy processing (collective) at step 1307 described later.

Subsequently, the copy program 54 updates the "copy status" to "in execution" (step 1302).

Subsequently, the copy program 54 determines whether the migration source storage system 2a is able to provide the TP information from the external volume management information 63 (step 1303).

If the provision of the TP information is not possible (N at step 1303), the copy program 54 executes the normal copy processing (step 1304).

If the provision of the TP information is possible (Y at step 1303), the copy program 54 determines whether the "TP information referral mode" is "individual" (step 1305).

If the TP information referral mode is "individual" (Y at step 1305), the copy program 54 executes the TP information utilization copy processing (individual) (step 1306).

If the TP information referral mode is not "individual" (N at step 1305), the copy program 54 executes the TP information utilization copy processing (collective) (step 1307).

Figure 20:
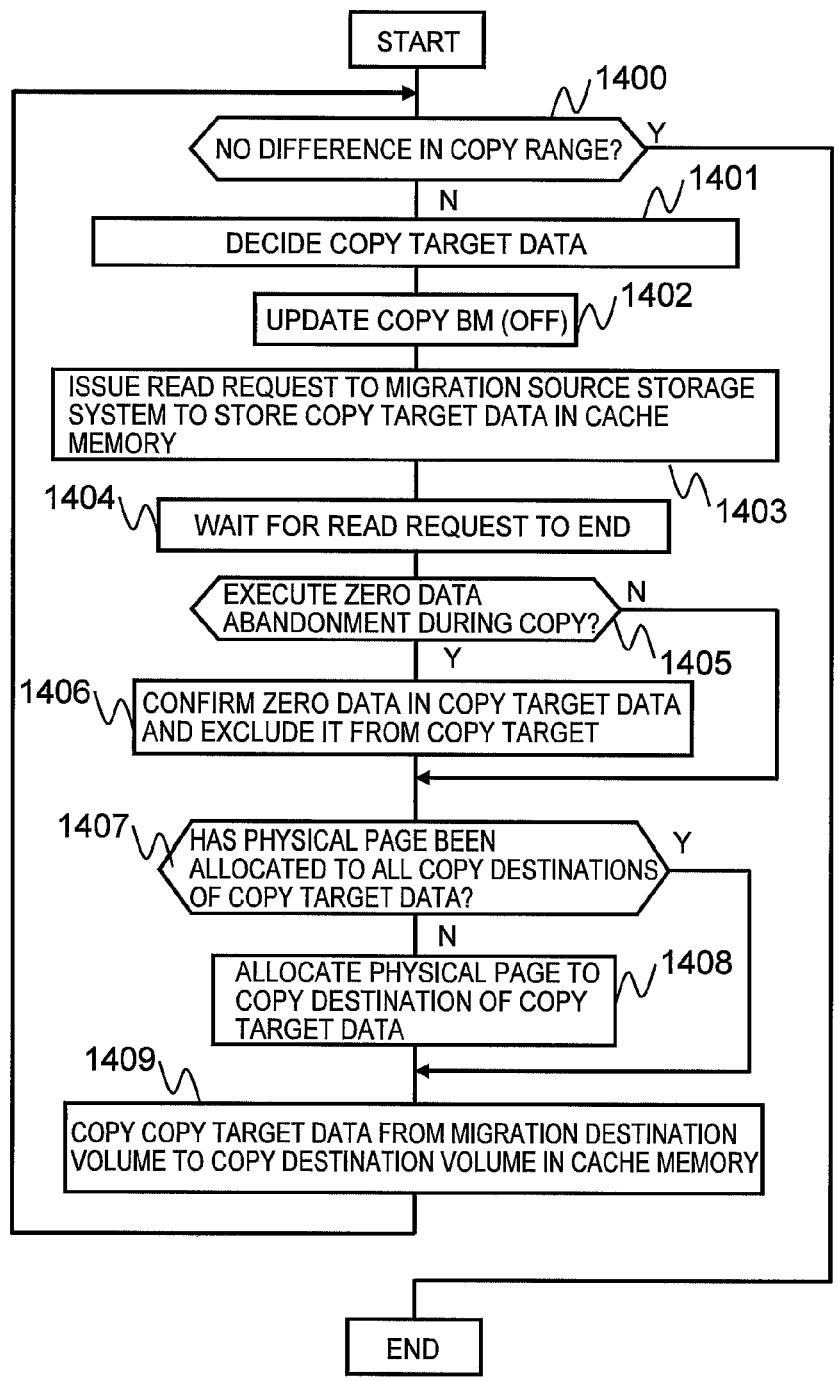
FIG. 20 shows the flow of the normal copy processing.

FIG. 20 shows the flow of the normal copy processing.

Foremost, the copy program 54 determines whether there is any difference in the copy range (step 1400). Specifically, the copy program 54 determines whether the "residual quantity" of the copy management information 67 is "0".

If there is no difference in the copy range (Y at step 1400), the copy program 54 ends the normal copy processing.

If there is a difference in the copy range (N at step 1400), the copy program 54 decides the data in the area (virtual page in the copy source volume (migration source volume 23a)) corresponding to the location of the bit "ON" as the copy target data based on the "copy BM" (step 1401).

Subsequently, the copy program 54 updates the bits in the "copy BM" corresponding to the copy target range to "OFF" (step 1402). The reason why the "copy BM" is updated prior to executing the copy processing is because, if writing is performed by the host into the copy target range during the copy processing, it is necessary to set the write range as the copy target once again.

Subsequently, the copy program 54 issues a read request to the migration source storage system 2a so as to store the copy target data in the cache memory 215a (step 1403), and waits until the read request is complete (step 1404).

Subsequently, the copy program 54 refers to the "zero data abandonment mode," and determines whether to execute zero data abandonment during the copy (step 1405).

If zero data abandonment is not to be executed during the copy (N at step 1405), the copy program 54 performs step 1407.

If zero data abandonment is to be executed during the copy (Y at step 1405), the copy program 54 excludes the zero data in the copy target data from the copy target (step 1406). The specification of the zero data may be performed with hardware or a computer program.

Subsequently, the copy program 54 determines whether a physical page has been assigned to all virtual pages of the copy destination of the copy target data in the TP volume (virtual volume) 24c corresponding to the copy destination volume 23c (step 1407).

If a physical page has been assigned to all virtual pages (Y at step 1407), the copy program 54 performs step 1409.

If an unassigned virtual page is included in all virtual pages (N at step 1407), the copy program 54 allocates a physical page to all unassigned virtual pages (step 1408). Specifically, the copy program 54 assigns a physical page to a virtual page of the copy destination according to the pool unused capacity allocation command received at step 1108.

Subsequently, the copy program 54 copies the copy target data in the cache memory 215b to the copy destination volume 23c through the migration destination volume 23b (step 1409). The data that is copied to the copy destination volume 23c is written into the storage apparatus 20b via asynchronous write processing. Step 1400 is subsequently performed.

Figure 21:
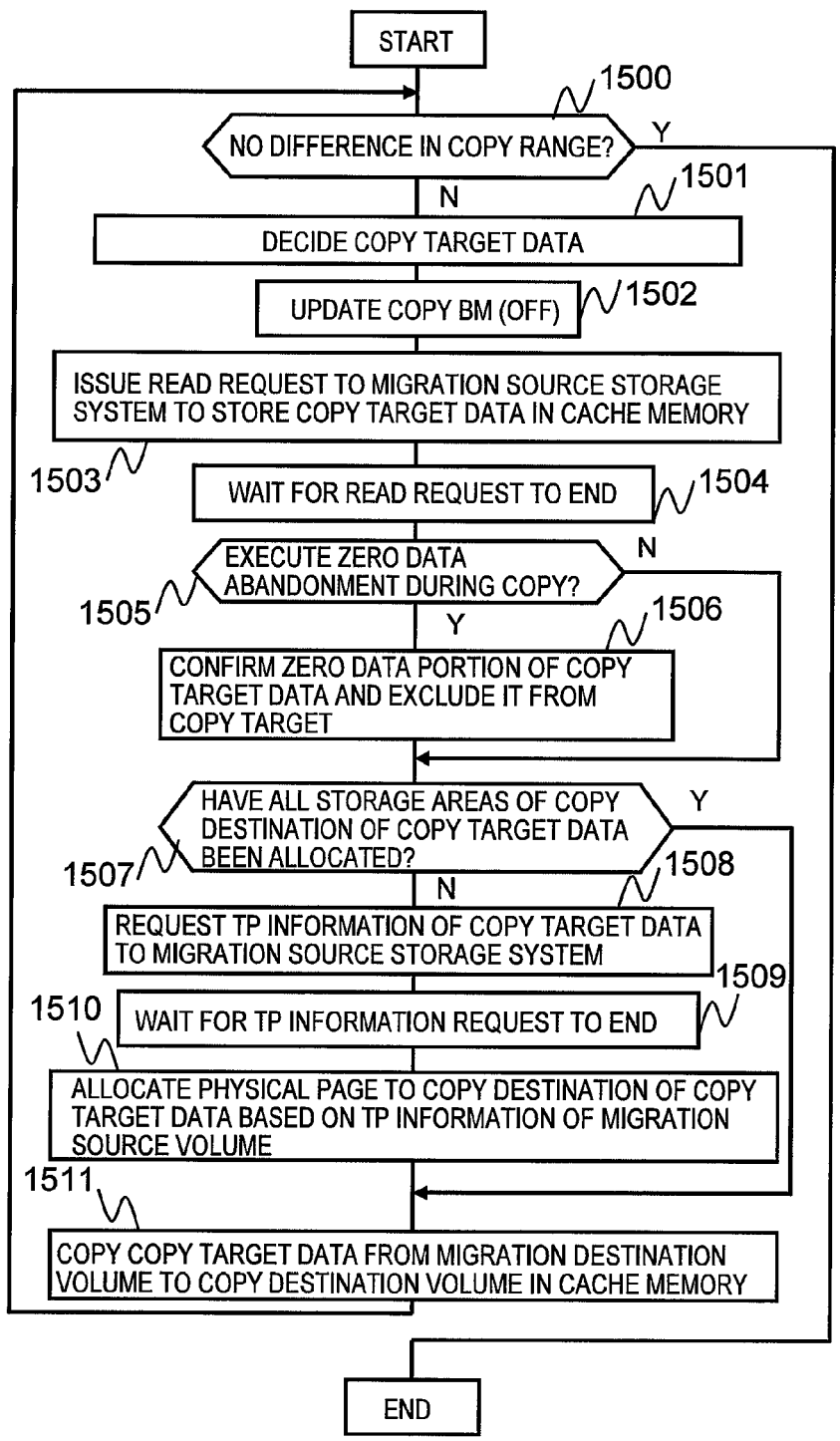
FIG. 21 shows the flow of the thin provisioning (TP) information utilization copy processing (individual).

FIG. 21 shows the flow of the TP information utilization copy processing (individual).

The difference with the normal copy processing is that, upon allocating a storage area of the copy destination of the copy target data, the copy program 54 requests the migration source storage system 2a to send the TP information of the copy target data, and assigns a physical page to the TP volume (virtual volume) 24c of the copy destination volume 23c by using such TP information.

Since step 1500 to step 1506 and step 1511 are the same as step 1400 to step 1406 and step 1409 of the normal copy processing, the explanation thereof is omitted.

Subsequently, the copy program 54 determines whether a physical page has been assigned to all virtual pages of the copy destination of the copy target data in the TP volume (virtual volume) 24c corresponding to the copy destination volume 23c (step 1507).

If a physical page has been assigned to all virtual pages (Y at step 1507), the copy program 54 performs step 1511.

If an unassigned virtual page is contained in all virtual pages (N at step 1507), the copy program 54 requests the migration source storage system 2a to send the TP information of the copy target data (step 1508), and waits for the TP information request to end (step 1509).

Subsequently, the copy program 54 assigns a physical page to all unassigned virtual pages of the copy destination in the TP volume 24c of the copy destination volume 23c by using the TP information of the migration source volume 23a (step 1510). Specifically, the copy program 54 assigns a physical page to a virtual page of the copy destination according to the pool unused capacity allocation command received at step 1108.

Figure 22:
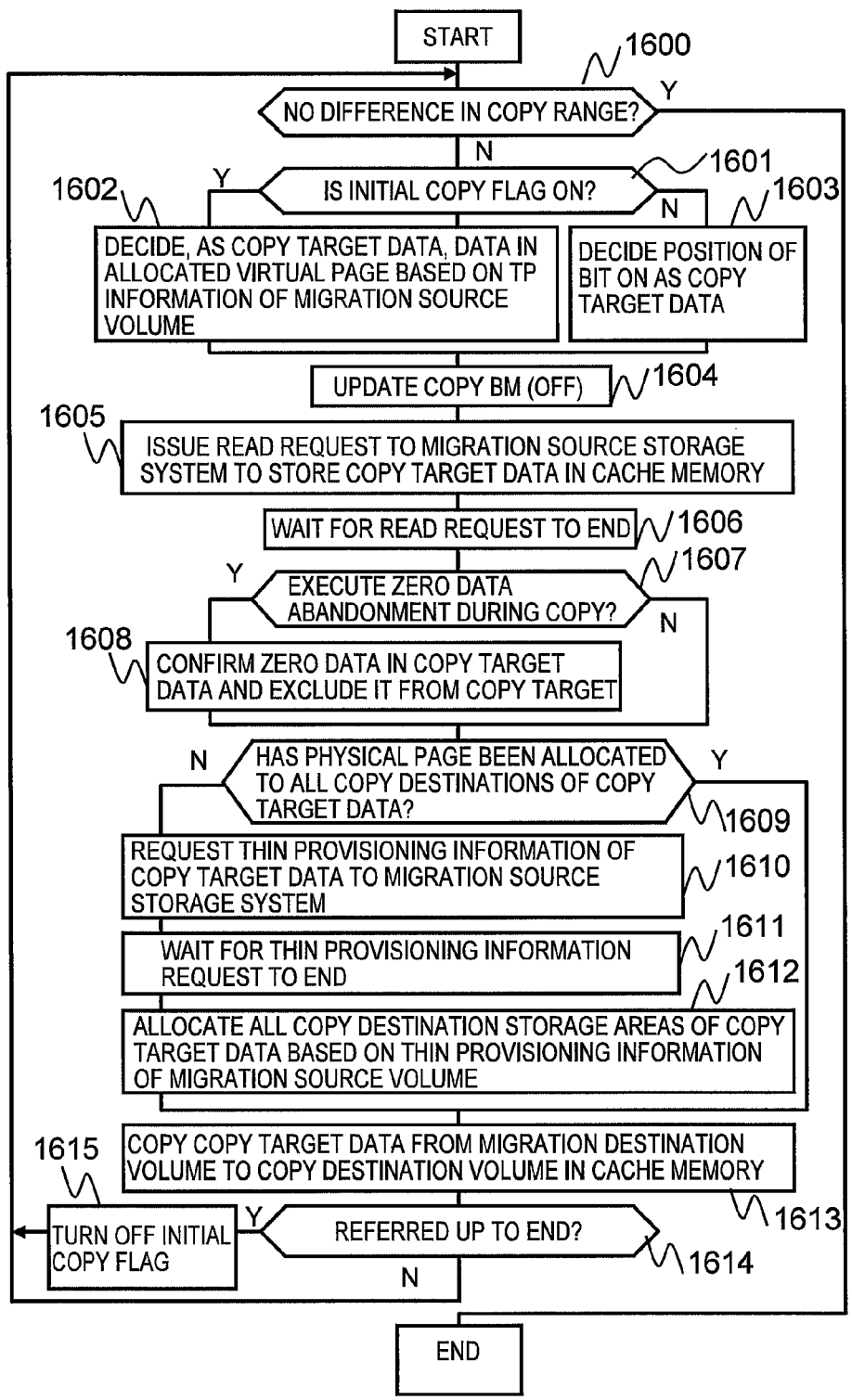
FIG. 22 shows the flow of the TP information utilization copy processing (collective).

FIG. 22 shows the flow of the TP information utilization copy processing (collective).

The difference with the TP information utilization copy processing (individual) is that, in the case of the initial copy status where, after the copy is started, the copy from the top to the end of the copy source volume has not yet been completed, the mapping management information 66 of the TP information of the copy source volume is referred to in order to avoid reading from an unassigned storage area (virtual page). It is thereby possible to reduce the amount of data of the copy target.

Since step 1600, step 1603 to step 1613 are the same as step 1500, step 1501 to 1511 of the TP information utilization copy processing (individual), the explanation thereof is omitted.

The copy program 54 determines whether the "initial copy flag" (refer to FIG. 14) is "ON" (step 1601). If the "initial copy flag" is "ON" (Y at step 1601), the copy program 54 decides the data in the virtual page to which a physical page is assigned as the copy target data based on the TP information of the migration source volume 23a, and excludes the data in the unassigned virtual page from the copy target data (step 1602).

Moreover, the copy program 54 determines whether the copy processing has completed the copy up to the end of the volume (step 1614). If the copy processing has completed the copy up to the end of the volume (Y at step 1614), the copy program 54 sets the "initial copy flag" to "OFF" (step 1615).

The explanation is continued by returning to FIG. 19.

The copy program 54 updates the "read/write inhibition flag" corresponding to the migration destination volume 23b to "ON" (step 1308). The range of read/write inhibition is the entire volume. The read/write processing to that volume is temporarily reserved.

Subsequently, the copy program 54 once again determines whether there is any difference in the copy range (step 1309). Specifically, the copy program 54 determines whether the "residual quantity" of the copy management information 67 is "0".

If there is a difference in the copy range (N at step 1309), the copy program 54 determines that there is crossing of write from the host 1, and returns to step 1303 to once again execute the copy processing. The "crossing of write" refers to a situation where data is written into an area of the copy source after data is migrated from an area of the copy source to the copy area during the copy processing. In the foregoing case, it is necessary to once again copy data from the copy source are to the copy destination area.

If there is no difference in the copy range (Y at step 1309), the copy program 54 changes the mapping between the logical volume and the virtual volume regarding the migration destination volume 23b and the copy destination volume 23c (step 1310). Specifically, the copy program 54 changes the association that was logical volume (migration destination volume) 23b-virtual volume 24b and logical volume (copy destination volume) 23c-virtual volume 24c, to the association of logical volume (migration destination volume) 23b-virtual volume 24c and logical volume (copy destination volume) 23c-virtual volume 24b. From this step 1310 onward, if the migration destination storage system 2b receives an access request designating the migration destination volume 23b, access will be made to the virtual volume 24c (specifically, the physical page in the pool 25b assigned to the virtual volume 24c).

Subsequently, the copy program 54 updates the "read/write inhibition flag" corresponding to the copy destination volume 23c to "OFF" (step 1311). The reservation of the read/write processing to the volume is released.

Finally, the copy program 54 updates the "copy status" to "suspended" (step 1312).

Note that apart, and not the whole, of the TP information concerning the migration source volume 23a of the migration source storage system 2*a* may be migrated. For example, the information contained in the "page access frequency information" in the mapping management information 66*a* may be migrated based on the difference in the "page size" of the migration source storage system 2*a* and the "page size" of the migration destination storage system 2*b*. For example, if the page size is the same, the TP information is migrated as is, and if the "page size" of the migration destination storage system 2*b* is an integral multiple of the "page size" of the migration source storage system 2*a*, information A concerning a plurality of pages of the migration source storage system 2*a* may be migrated as information B concerning one page of the migration destination storage system 2*b*. In other words, the information A may be managed as information concerning one page in the migration destination storage system 2*b*.

Figure 23:
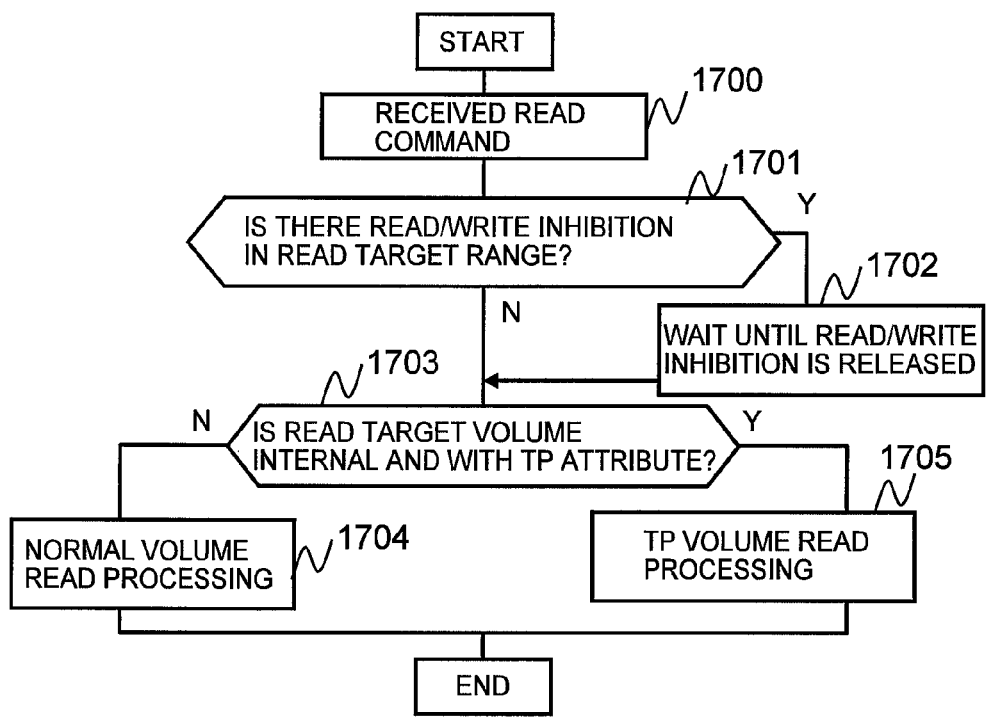
FIG. 23 shows the read processing to be executed by the storage system 2a (2b).

FIG. 23 shows the read processing to be executed by the storage system 2*a* (2*b*).

Based on a read request from the host 1 or another storage system 2, the processor of the processor package 213 executes the read program 50. The read processing shown in FIG. 23 is thereby performed.

The read program 50 receives a read request (step 1700). The access request (read request and write request) contains information (access destination information) representing the access destination. The access destination information contains a logical volume number of the access destination (LUN, for example), and information representing the range of the access destination (for example, a combination of an address (LBA (Logical Block Address), for example) and the length of the access target data). In the read processing, the logical volume of the access destination is the read target volume, and the range of the access destination is the read target range.

Subsequently, the read program 50 determines whether there is "read/write inhibition" regarding the read target range (step 1701). This determination can be made based on the value of the "read/write inhibition flag" corresponding to the read target volume and the value of the "read/write inhibition range".

If there is no read/write inhibition (N at step 1701), the read program 50 performs step 1703.

If there is read/write inhibition (Y at step 1701), the read program 50 inhibits (reserves) the read processing until the read/write inhibition is released (step 1702).

Subsequently, the read program 50 determines whether the "storage location" corresponding to the virtual volume associated with the read target volume is "internal" (that is, whether that virtual volume exists in the storage system that received the read request), and whether the "TP attribute" corresponding to the virtual volume is "YES" (step 1703).

If the determination result at step 1703 is negative (N at step 1703), the read program 50 executes the normal volume read processing (step 1704).

If the determination result at step 1703 is affirmative (Y at step 1703), the read program 50 executes the TP volume read processing (step 1705).

Figure 24:
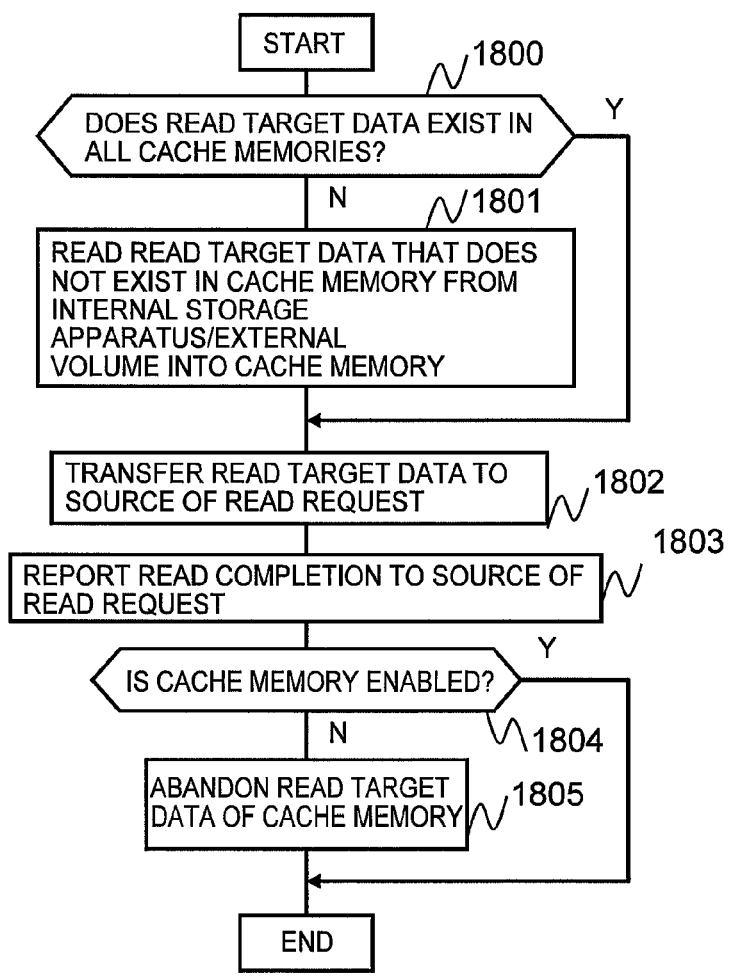
FIG. 24 shows the flow of the normal volume read processing.

FIG. 24 shows the flow of the normal volume read processing.

The read program 50 determines whether all read target data in the read target range exists in the cache memory 215 (step 1800).

If all read target data exists in the cache memory 215 (Y at step 1800), the read program 50 performs step 1802.

If the read target data contains data that does not exist in the cache memory 215 (N at step 1800), the read program 50 reads the data that does not exist in the cache memory 215 from the internal storage apparatus or the external volume to the cache memory 215 according to the substance of the read target volume (step 1801).

Subsequently, the read program 50 transfers the data that was read to the cache memory 215 to the requestor of the read request (the host 1 or a storage system that is different from the storage system that received the read request) (step 1802).

Subsequently, the read program 50 reports the completion of read to the read request requester (step 1803).

Subsequently, the read program 50 determines the cache memory operability of the read target volume (value of the "cache operational status" corresponding to the virtual volume of the read target volume) (step 1804).

If the cache memory operation is enabled (Y at step 1804), the read program 50 ends the read processing.

If the cache memory operation is inhibited (N at step 1804), the read program 50 abandons the read target data that was read to the cache memory (step 1805).

Figure 25:
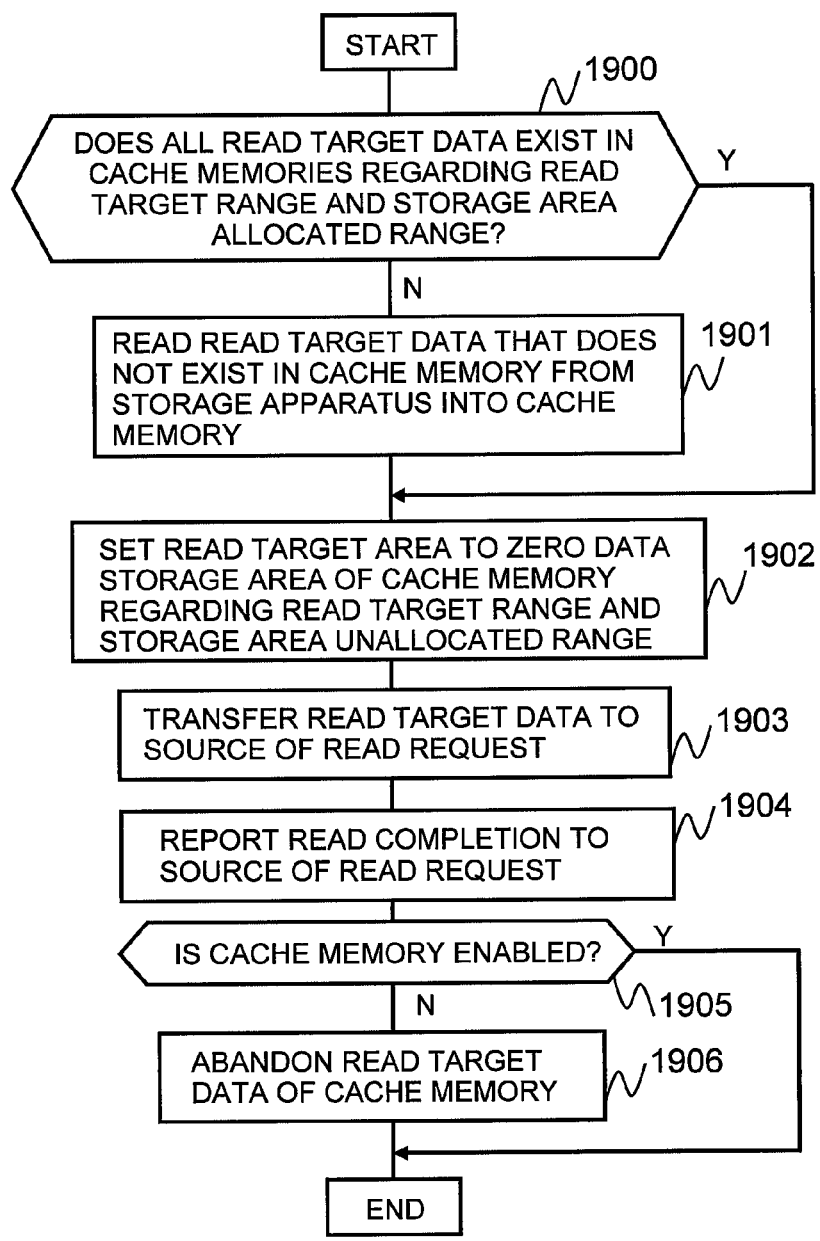
FIG. 25 shows the flow of the TP volume read processing.

FIG. 25 shows the flow of the TP volume read processing.

Since step 1901, step 1903 to step 1906 are the same as step 1801 to 1805 of the normal volume read processing, the explanation thereof is omitted.

The read program 50 determines whether all read target data exists in the cache memory 215 regarding the read target range (range to which a physical page has been assigned) (step 1900).

Moreover, the read program 50 sets the read target data in the zero data storage area of the cache memory 215 regarding the read target range (range to which a physical page has not been assigned) (step 1902).

Figure 26:
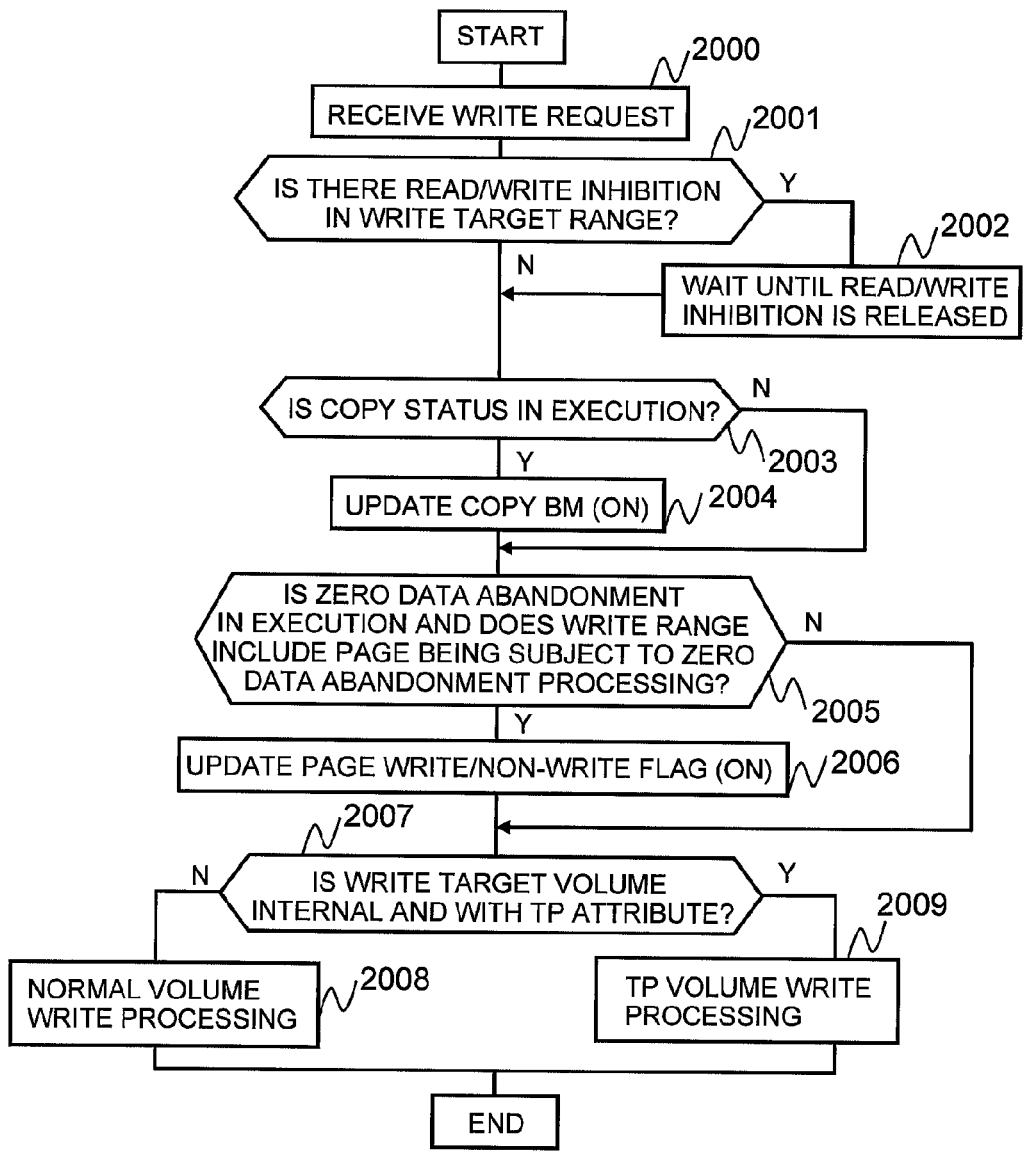
FIG. 26 shows the write processing.

FIG. 26 shows the write processing to be executed by the storage system 2*a* (2*b*).

Specifically, based on a write request from the host 1 or another storage system 2, the processor of the processor package 213 executes the write program 51. The write processing shown in FIG. 26 is thereby performed. In the write processing, the logical volume of the access destination is the write target volume, and the range of the access destination is the write target range.

The write program 51 receives a write command (step 2000).

Subsequently, the write program 51 determines whether there is read/write inhibition in the write target range (step 2001). This determination can be made based on the value of the "read/write inhibition flag" corresponding to the write target volume and the value of the "read/write inhibition range".

If there is no read/write inhibition (N at step 2001), the write program 51 performs step 2003.

If there is read/write inhibition (Y at step 2001), the write program 51 inhibits (reserves)) the write processing until the read/write inhibition is released (step 2002).

Subsequently, the write program 51 determines whether the "copy status" corresponding to the write target volume is "in execution" (step 2003).

If the "copy status" is not "in execution" (N at step 2003), the write program 51 performs step 2005.

If the "copy status" is "in execution" (Y at step 2003), the write program 51 updates all bits (bits in the "copy BM") corresponding to the write target range to "ON" (step 2004).

Subsequently, the write program 51 determines whether the "processing status" of the zero data abandonment management information 68 corresponding to the write target volume is "in execution" and whether the write target range contains a virtual page which is currently being subject to the zero data abandonment processing (step 2005). Whether the write target range contains a virtual page which is currently being subject to the zero data abandonment processing can be determined based on the "page progress pointer" in the management information 68.

If the determination result at step 2005 is negative (N at step 2005), the write program 51 performs step 2007.

If the determination result at step 2005 is affirmative (Y at step 2005), the write program 51 updates the "page write/non-write flag" in the management information 68 to "ON" (step 2006).

Subsequently, the write program 51 determines whether the "storage location" corresponding to the virtual volume associated with the write target volume is "internal" (specifically, whether that virtual volume exists in the storage system that received the write request), and whether the "TP attribute" corresponding to the virtual volume is "YES" (step 2007).

If the determination result at step 2007 is negative (N at step 2007), the write program 51 executes the normal volume write processing (step 2008).

If the determination result at step 2007 is affirmative (Y at step 2007), the write program 51 executes the TP volume write processing (step 2009).

Figure 27:
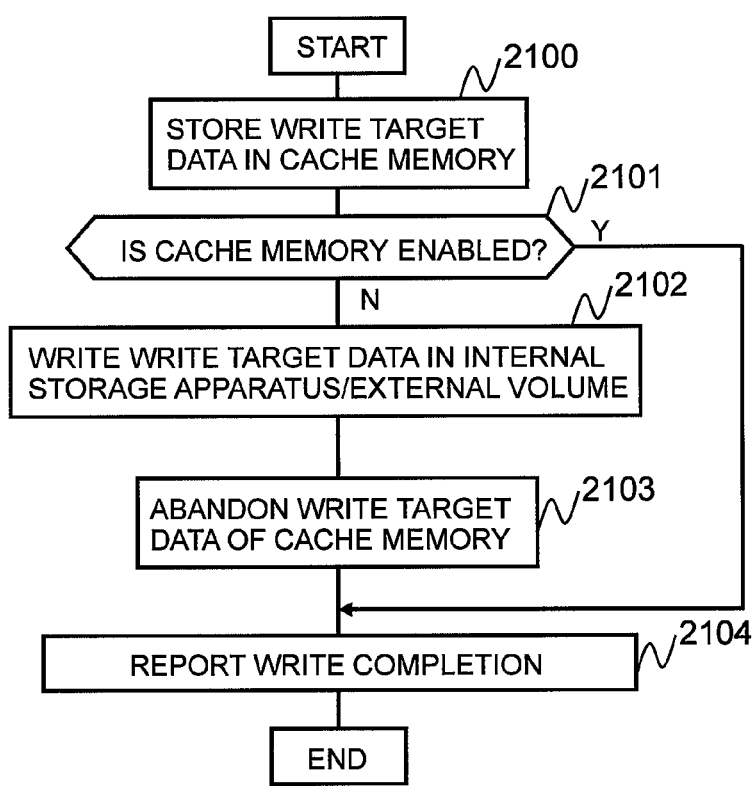
FIG. 27 shows the flow of the normal volume write processing.

FIG. 27 shows the flow of the normal volume write processing.

The write program 51 stores the write target data according to the write request in the cache memory 215 (step 2100).

Subsequently, the write program 51 determines the cache memory operability of the write target volume (value of the "cache operational status" corresponding to the virtual volume of the write target volume) (step 2101).

If the cache memory operation is enabled (Y at step 2101), the write program 51 performs step 2104.

If the cache memory operation is inhibited (N at step 2101), the write program 51 writes the write target data stored in the cache memory 215 into the internal storage apparatus or the external volume according to the substance of the write target volume (step 2102). Here, for example, if the write target volume is an internal virtual volume based a drive group of RAID 5 or RAID 6, as needed, old data and old parity of the write target are read to the cache memory 215, new parity is created based thereon, and the new parity may be written together with the write target data in the drive group. Moreover, for example, if the write target volume is an internal virtual volume based on a drive group of RAID 1, the write target data may be duplicated and written in the drive group.

Subsequently, the write program 51 abandons the write target data that was stored in the cache memory 215 (step 2103).

Subsequently, the write program 51 reports the write end to the requestor of the write request (the host 1 or a storage system that is different from the storage system that received the write request) (step 2104).

Figure 28:
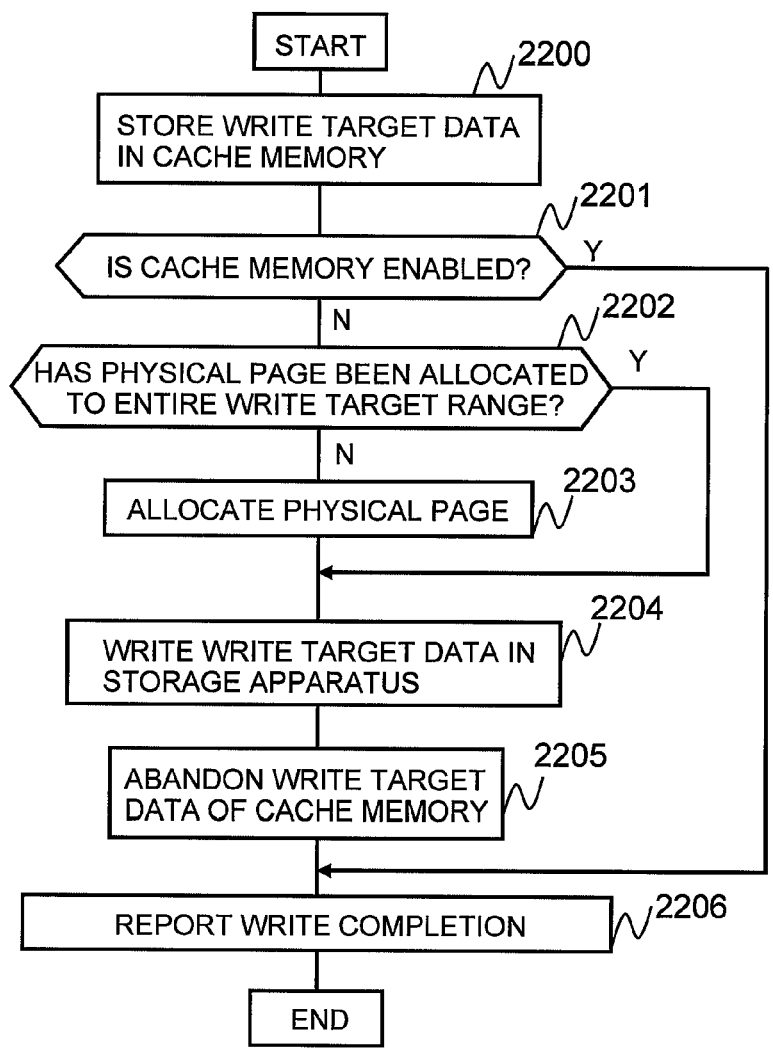
FIG. 28 shows the flow of the TP volume write processing.

FIG. 28 shows the flow of the TP volume write processing.

Since step 2200, step 2201, step 2204 to step 2206 are the same as step 2100 to step 2104 of the normal volume write processing, the explanation thereof is omitted.

The write program 51 determines whether a physical page has been assigned to all virtual pages belonging to the write target range (step 2202).

If at least one unassigned virtual page belongs to the write target range (N at step 2202), the write program 51 assigns a physical page to all unassigned virtual pages (step 2203).

Figure 29:
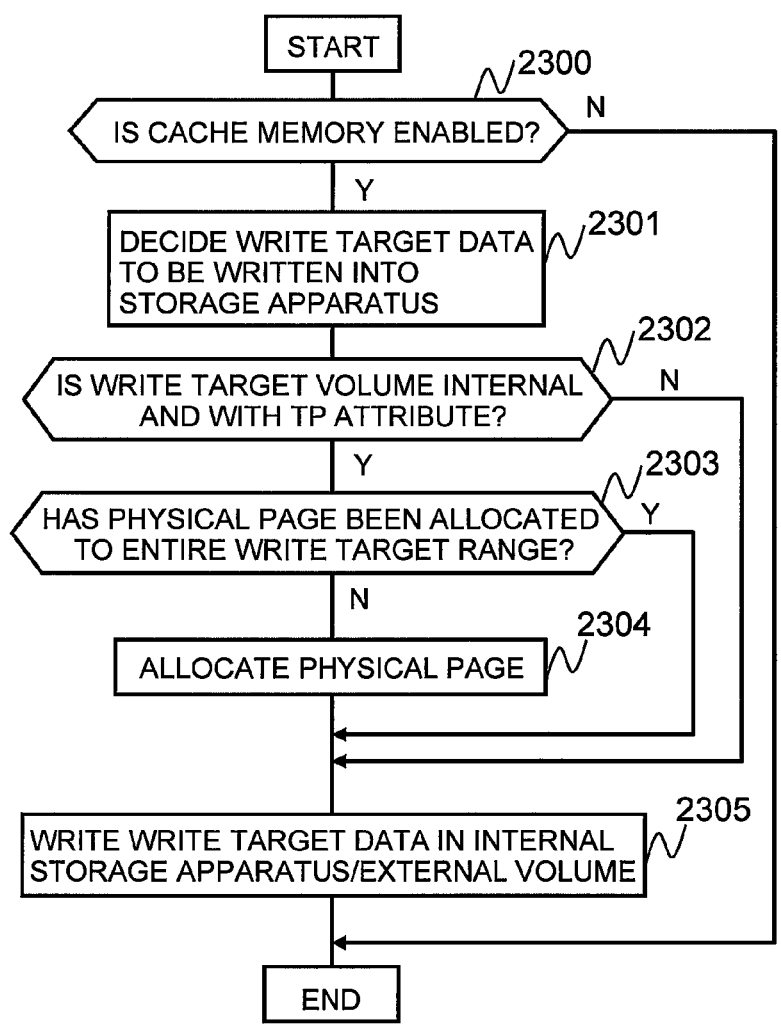
FIG. 29 shows the flow of the asynchronous write processing.

FIG. 29 shows the flow of the asynchronous write processing to be executed by the storage system 2a (2b).

Specifically, for example, the storage system 2a (2b) periodically (or randomly) executes the asynchronous write program 56 of the processor package 213. The asynchronous write processing shown in FIG. 29 is thereby performed.

The asynchronous write program 56 determines the cache memory operability of the asynchronous write target volume (step 2300).

If the cache memory operation is inhibited (N at step 2300), the asynchronous write program 56 ends the asynchronous write processing. The reason for this is because all dirty data has been written into the storage apparatus or the external volume in synch with the write request from the host 1 or another storage system.

Subsequently, the asynchronous write program 56 decides the write target data from the dirty data of the asynchronous write target volume (data which has not yet been written into a drive in the cache memory 215) (step 2301).

Subsequently, the asynchronous write program 56 determines whether the "storage location" corresponding to the virtual volume associated with the asynchronous write target volume is "internal" and whether the "TP attribute" corresponding to that virtual volume is "YES" (step 2302).

If the determination result at step 2302 is negative (N at step 2302), the asynchronous write program 56 performs step 2305.

If the determination result at step 2302 is affirmative (Y at step 2302), the asynchronous write program 56 determines whether a physical page has been assigned to all virtual pages belonging to the write target range (step 2303).

If a physical page has been assigned to all virtual pages belonging to the write target range (Y at step 2303), the asynchronous write program 56 performs step 2305.

If there is at least one unassigned virtual page in the write target range (N at step 2303), the asynchronous write program 56 assigns a physical page to such unassigned virtual pages (step 2304).

Subsequently, the asynchronous write program 56 writes the write target data that was stored in the cache memory 215 in the internal storage apparatus or the external volume according to the substance of the write target volume (step 2305).

Figure 30:
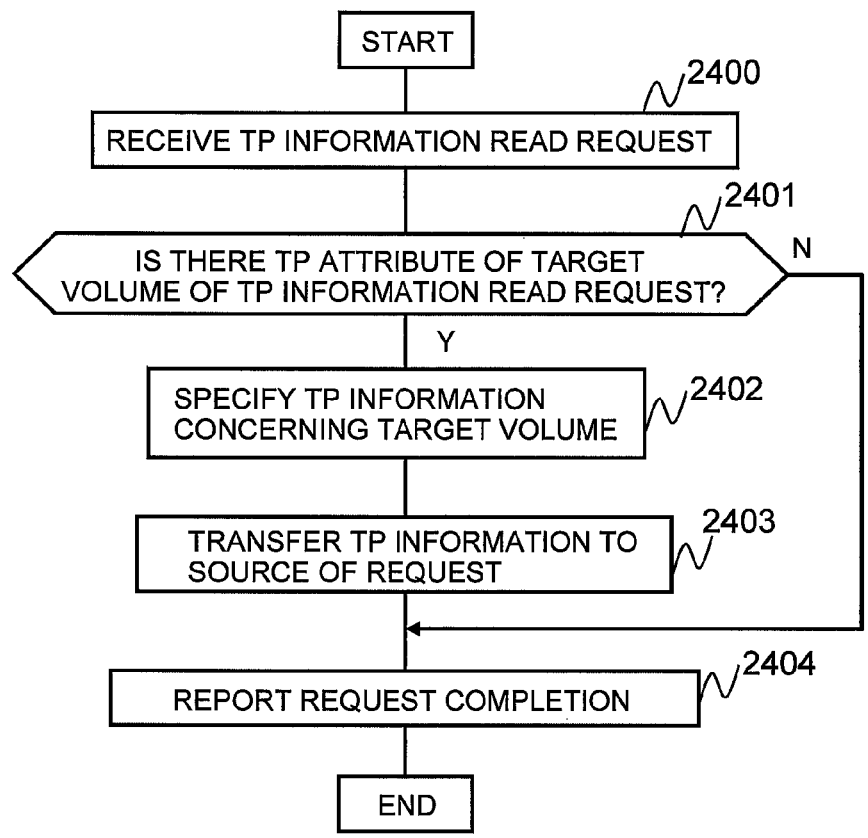
FIG. 30 shows the TP information referral processing.

FIG. 30 shows the TP information referral processing to be executed by the migration source storage system 2a.

Specifically, for example, based on a request from another storage system 2, the processor of the processor package 213a executes the TP information referral program 52. The TP information referral processing shown in FIG. 30 is thereby performed.

The TP information referral program 52 receives a TP information read request (step 2400).

Subsequently, the TP information referral program 52 determines whether the "TP attribute" in the virtual volume management information 61 corresponding to the target volume of the TP information read request is "YES" (step 2401).

If the "TP attribute" is "NO" (N at step 2401), the program 52 performs step 2404.

If the "TP attribute" is "YES" (Y at step 2401), the program 52 specifies the TP information 69 corresponding to the target volume of the TP information read request (step 2402), and transfers the information contained in the TP information 69 to the requestor of the TP information read request (step 2403).

Subsequently, the program 52 reports the request end to the requestor of the TP information read request (step 2404). If the determination result at step 2401 is N, error may be reported at this step 2404.

Figure 31:
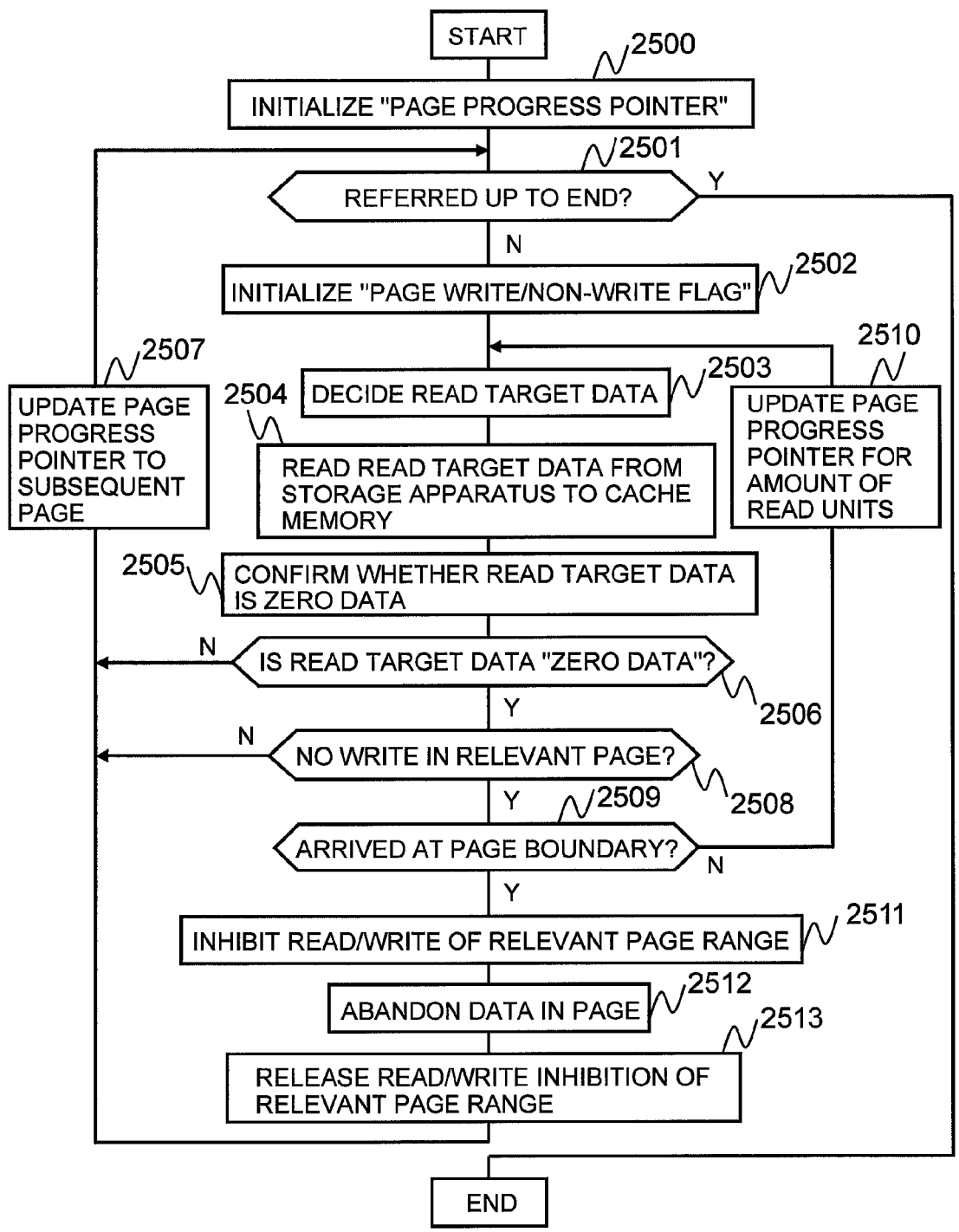
FIG. 31 shows the flow of the zero data abandonment processing.

FIG. 31 shows the flow of the zero data abandonment processing to be executed by the storage system 2a (2b).

Specifically, the storage system 2a (2b) periodically (or randomly) executes the zero data abandonment program 55 with the processor of the processor package 213. The zero data abandonment processing shown in FIG. 31 is thereby performed.

Foremost, the zero data abandonment program 55 initializes "the page progress pointer" (refer to FIG. 15) corresponding to the logical volume (hereinafter referred to as the "target volume" in the explanation of FIG. 31) to be subject to the zero data abandonment processing (step 2500).

Subsequently, the program 55 determines whether referral was made up to the end of the target volume (step 2501).

If referral was made to the end of the target volume (Y at step 2501), the program 55 ends the zero data abandonment processing.

If referral has not yet been made to the end of the target volume (N at step 2501), the program 55 initializes (turns "OFF") the "page write/non-write flag" regarding the zero data abandonment target page (step 2502).

Subsequently, the program 55 decides the read target data of the zero data abandonment target page from the page progress pointer (step 2503).

Subsequently, the program 55 reads the read target data from the storage apparatus 20 to the cache memory 215 (step 2504).

Subsequently, the program 55 confirms whether the read target data is zero data (step 2505).

Subsequently, the program 55 determines whether all read target data is zero data (step 2506).

If a part of the read target data is not zero data (N at step 2506), since data in that page cannot be abandoned, the program 55 updates the "page progress pointer" to the subsequent page (step 2507), and performs step 2501.

If all read target data is zero data (Y at step 2506), the program 55 determines whether no writing was performed in that page during the zero data confirmation based on the "page write/non-write flag" (step 2508).

If writing was performed in that page during the zero data confirmation (N at step 2508), since the data in that page cannot be abandoned, the program 55 updates the "page progress pointer" to the subsequent page (step 2507), and performs step 2501.

If no writing was performed in that page during the zero data confirmation (Y at step 2508), the program 55 determines whether the read target range has reached the page boundary (step 2509).

If the read target range has not reached the page boundary (N at step 2509), the program 55 updates the "page progress pointer" in the amount of read units (step 2510) and performs step 2503.

If the read target range has reached the page boundary (Y at step 2509), the program 55 inhibits the read/write of that page by updating the "read/write inhibition flag" and the "read/write inhibition range" (step 2511), abandons the data in that page (step 2512), and releases the read/write inhibition of that page (step 2513). Step 2507 is subsequently performed.

Second Embodiment

The second embodiment of the present invention is now explained. Here, the differences with the first embodiment are mainly explained, and explanation concerning the points that are common with the first embodiment are omitted or simplified.

Figure 32:
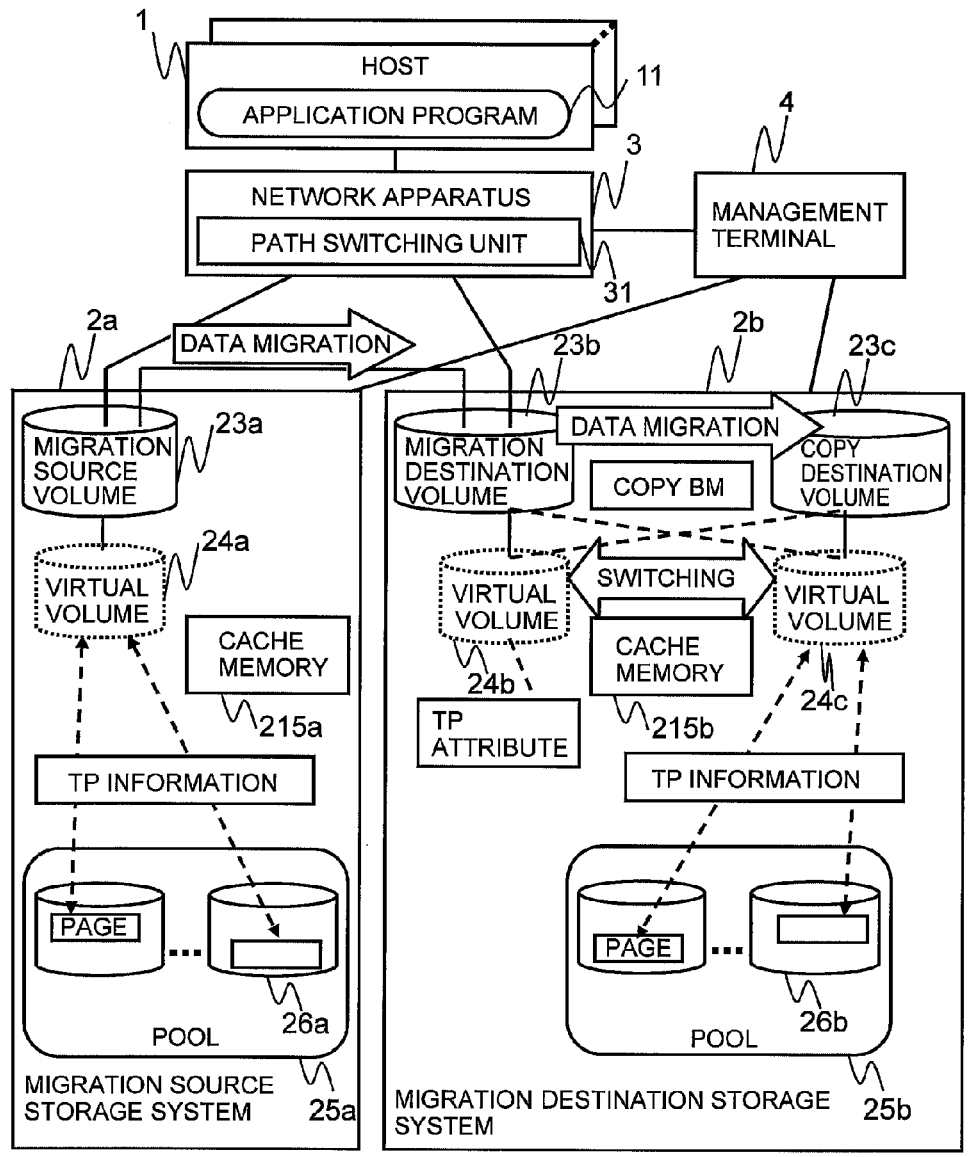
FIG. 32 shows the configuration of the computer system according to the second embodiment of the present invention.

FIG. 32 shows the configuration of the computer system according to the second embodiment of the present invention.

The difference with the first embodiment is that the migration source storage system 2a and the migration destination storage system 2b are coupled to the host 1 via a network device 3 having a path switching part 31. During the path switching of the host 1, the network device 3 switches the access path to the storage system 2 transparently to the host based on a command from the management terminal 4.

Certain embodiments of the present invention were explained above, but it goes without saying that the present invention is not limited to these embodiments and may be variously modified to the extent that it does not deviate from the gist thereof.

For example, in the present invention, the volume type of the migration target volume is no object. For instance, the migration target volume may be a mainframe volume. With a mainframe volume, there are cases of changing the control information concerning the format or the layout of a specific type of record in order to improve the access performance. However, control information may be newly created or the layout of a record may be changed upon separately receiving information from the migration source storage system 2a during data migration, or while performing data migration with the migration destination storage system 2b.

Moreover, with the foregoing first and second embodiments, the virtual volume 24a that is associated with the migration source volume 23a may substantially be a migration source volume, the virtual volume 24b that is associated with the migration destination volume 23b may substantially be a migration destination volume, and the virtual volume 24c that is associated with the copy destination volume 23c may substantially be a copy destination volume. The volume that is recognized by the host 1 may be, for example, a LUN.

In addition, with the copy processing at step 1006 of FIG. 16, the migration destination storage system 2b may specify an assigned virtual page corresponding to the copy source based on the TP information 69a (the mapping management information 66a, for example), and assign a physical page from the pool 25b to the virtual page of the TP volume 24c corresponding to the specified virtual page.

REFERENCE SIGNS LIST

1 . . . host; 2a . . . migration source storage system; 2b . . . migration destination storage system

The invention claimed is:

1. A data migration system, comprising:
a first storage system coupled to a host system;
a second storage system coupled to the first storage system and the host system; and
a management terminal coupled to the first storage system, second storage system and the host system,
wherein the first storage system comprises:
a first upper level logical volume;
a first lower level logical volume which is thin provisioned and configured from a plurality of virtual areas;
a first pool which is a storage area configured from a plurality of first physical areas; and
first thin provisioning information representing which first physical area is assigned to which virtual area of the first lower level logical volume,
wherein, upon receiving a write request designating the first upper level logical volume, the first storage system assigns the first physical area from the first pool to a virtual area of a write destination in the first lower level logical volume of the first upper level logical volume, writes write target data in the assigned first physical area, and updates the first thin provisioning information, wherein the second storage system comprises:

a second upper level logical volume;

a second lower level logical volume which is external;

a third upper level logical volume which configures a pair with the second upper level logical volume and which is a copy source;

a third lower level logical volume which is thin provisioned; and a second pool which is a storage area configured from a plurality of second physical areas, wherein the management terminal is configured to issue a command to the second storage system so that the second storage system maps the first upper level logical volume to the second lower level logical volume, issue a command to the host system so that the host system switches an access path between the first upper level logical volume and the second upper level logical volume, issue a command to the second storage system so that the second storage system executes copy processing of migrating data from the first upper level logical volume to the second upper level logical volume and copying the data from the second upper level logical volume to the third lower level logical volume through the third upper level logical volume.

2. The data migration system according to claim 1, wherein the second storage system further comprises a cache memory, and wherein the management terminal is configured to issue a command to the second storage system so that the second storage system inhibits the cache memory operation, send a data migration processing mode to the second storage system, receive display information representing required pool capacity and pool unused capacity from the second storage system, and display the display information.

3. The data migration system according to claim 2, wherein the management terminal is configured to display information including at least one of the following (a) to (f), and (a) information showing whether the first upper level logical volume can be migrated to a specific storage hierarchy of the second storage system by showing the comparison of required second-pool capacity and second-pool unused capacity of respective hierarchies, (b) information showing whether migration target data which is data in the first upper level logical volume can be migrated if distributed to a plurality of hierarchies by comparing the required second-pool capacity and the total second-pool unused capacity of all hierarchies, (c) information illustrating a storage example upon distributing and storing the migration target data in a plurality of hierarchies, (d) information showing the comparison of the required second-pool capacity of the respective storage hierarchies and the unused second-pool capacity of the respective hierarchies, (e) information showing whether the migration target data can be stored by changing the hierarchy of its storage destination by showing the comparison of the total required second-pool capacity of all hierarchies and the total unused second-pool capacity of all hierarchies, and (f) information illustrating a specific example upon changing the hierarchy of the storage destination, wherein, when the second-pool unused capacity is not insufficient, the management terminal is configured to issue, to the second storage system, a command to allocate the second-pool unused capacity, when the second-pool unused capacity is equal to or less than a threshold in the second storage system, receive a message, from the second storage system receiving the command to allocate the second-pool unused capacity, representing the second-pool capacity needs to be expanded after the copy is complete, display the received message, and obtain an input of the final determination of whether to start the copy processing.

4. A management terminal, comprising:

an interface device coupled to a first storage system, a second storage system and a host system; and a processor coupled to the interface device, wherein the first storage system coupled to the host system comprises:

a first upper level logical volume;

a first lower level logical volume which is thin provisioned and configured from a plurality of virtual areas;

a first pool which is a storage area configured from a plurality of first physical areas; and first thin provisioning information representing which first physical area is assigned to which virtual area of the first lower level logical volume, wherein, upon receiving a write request designating the first upper level logical volume, the first storage system assigns the first physical area from the first pool to a virtual area of a write destination in the first lower level logical volume of the first upper level logical volume, writes write target data in the assigned first physical area, and updates the first thin provisioning information, wherein the second storage system coupled to the host system comprises:

a second upper level logical volume;

a second lower level logical volume which is external;

a third upper level logical volume which configures a pair with the second upper level logical volume and which is a copy source;

a third lower level logical volume which is thin provisioned; and a second pool which is a storage area configured from a plurality of second physical areas, wherein the processor is configured to issue a command to the second storage system so that the second storage system maps the first upper level logical volume to the second lower level logical volume, issue a command to a host system coupled to the first and second storage systems, so that the host system switches an access path between the first upper level logical volume and the second upper level logical volume, issue a command to the second storage system so that the second storage system executes copy processing of migrating data from the first upper level logical volume to the second upper level logical volume and copying the data from the second upper level logical volume to the third lower level logical volume through the third upper level logical volume.

5. The management terminal according to claim 4, wherein the second storage system further comprises a cache memory, and wherein the processor is configured to issue a command to the second storage system so that the second storage system inhibits the cache memory operation, send a data migration processing mode to the second storage system, receive display information representing required pool capacity and pool unused capacity from the second storage system, and display the display information.

6. The management terminal according to claim 5, wherein the processor is configured to display information including at least one of the following (a) to (f), and (a) information showing whether the first upper level logical volume can be migrated to a specific storage hierarchy of the second storage system by showing the comparison of required second-pool capacity and second-pool unused capacity of respective hierarchies, (b) information showing whether migration target data which is data in the first upper level logical volume can be migrated if distributed to a plurality of hierarchies by comparing the required second-pool capacity and the total second-pool unused capacity of all hierarchies, (c) information illustrating a storage example upon distributing and storing the migration target data in a plurality of hierarchies, (d) information showing the comparison of the required second-pool capacity of the respective storage hierarchies and the unused second-pool capacity of the respective hierarchies, (e) information showing whether the migration target data can be stored by changing the hierarchy of its storage destination by showing the comparison of the total required second-pool capacity of all hierarchies and the total unused second-pool capacity of all hierarchies, and (f) information illustrating a specific example upon changing the hierarchy of the storage destination, wherein, when the second-pool unused capacity is not insufficient, the processor is configured to issue, to the second storage system, a command to allocate the second-pool unused capacity, when the second-pool unused capacity is equal to or less than a threshold in the second storage system, receive a message, from the second storage system receiving the command to allocate the second-pool unused capacity, representing the second-pool capacity needs to be expanded after the copy is complete, display the received message, and obtain an input of the final determination of whether to start the copy processing.

\* \* \* \* \*